Figure 6:
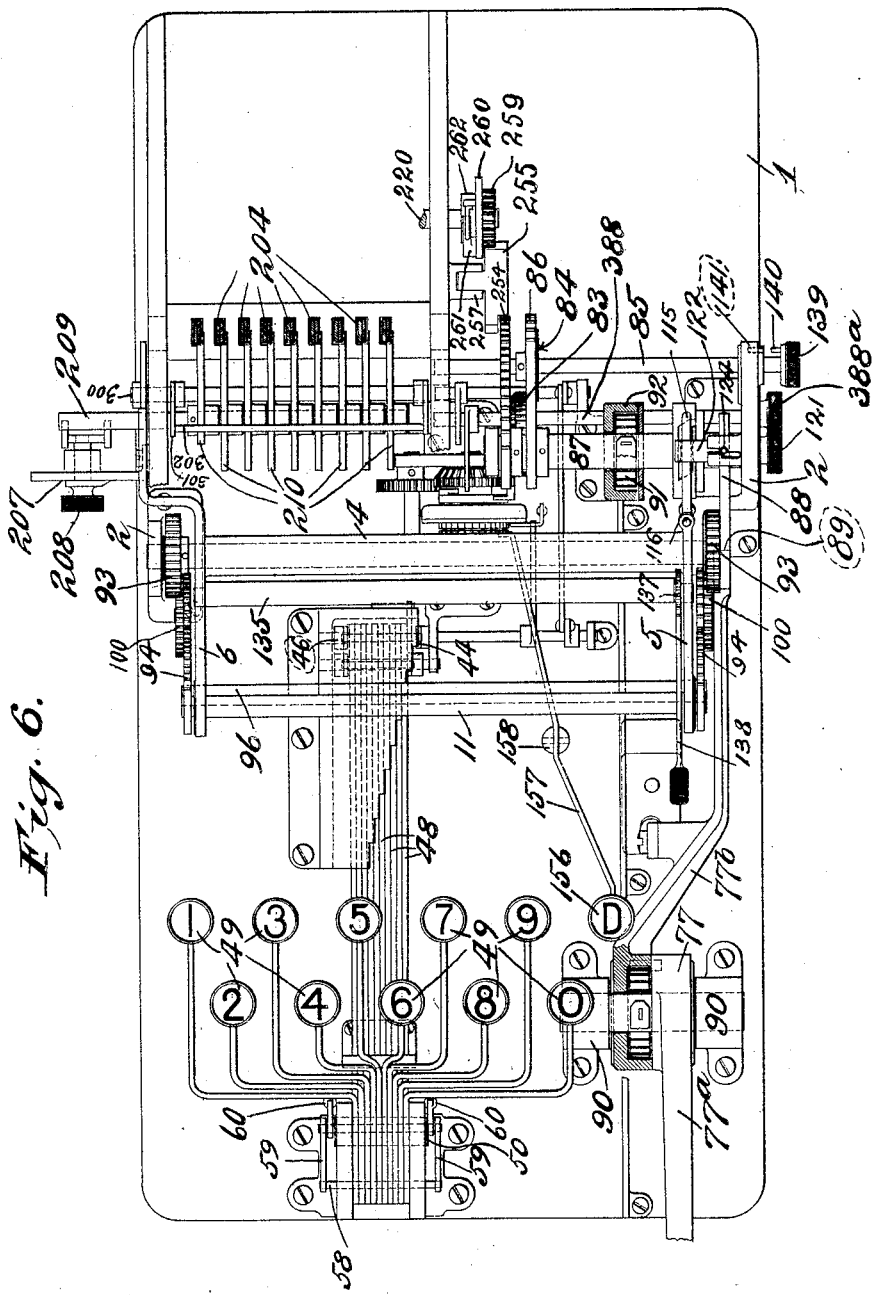

No. 885,522. PATENTED APR. 21, 1908.
R. VON REPPERT.
COMPUTING MACHINE.
APPLICATION FILED JULY 1, 1907.
15 SHEETS—SHEET 1.
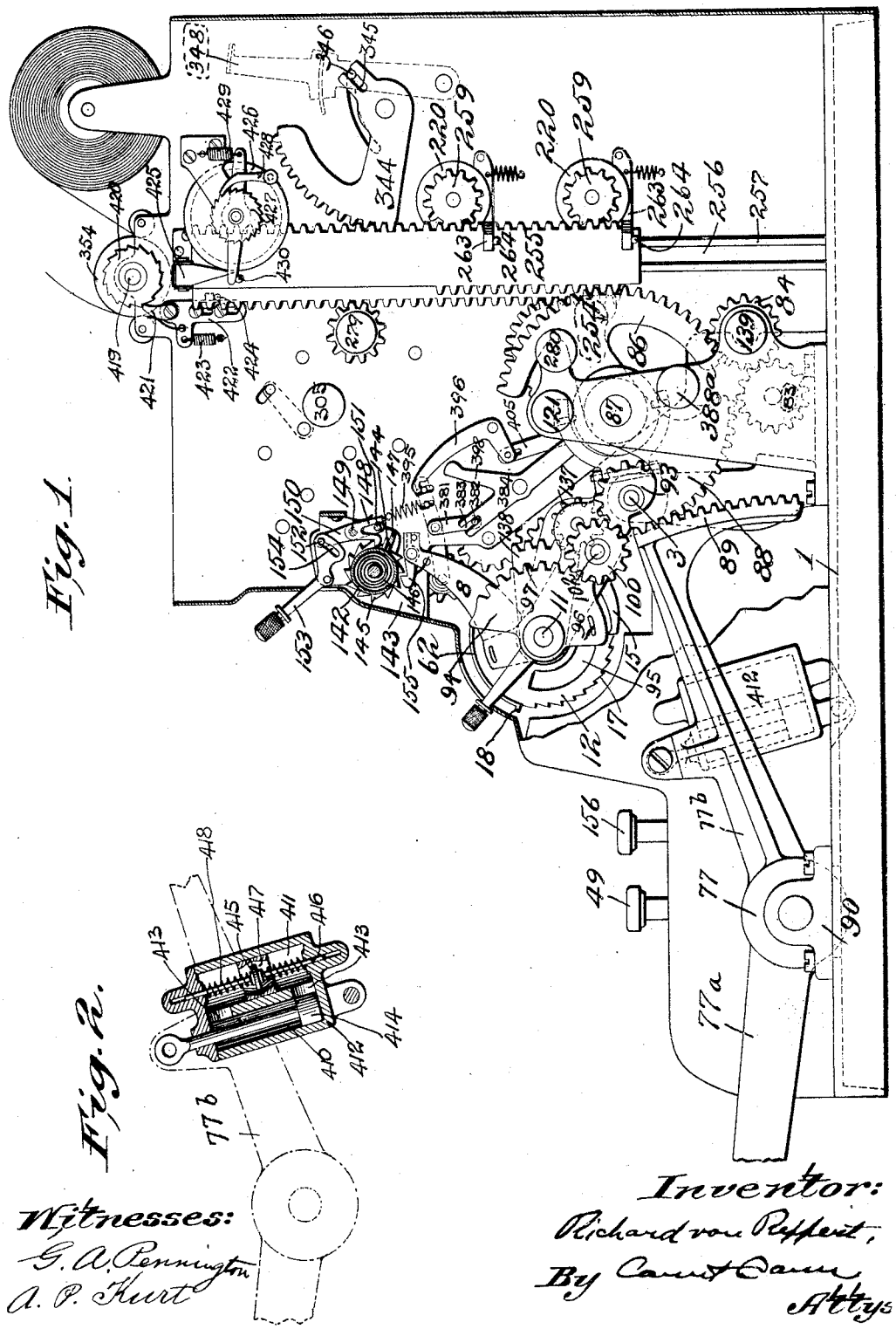
Witnesses:
G. A. Pennington
A. P. Kurt
Inventor:
Richard von Reppert,
By Carr & Carr
Attys No. 885,522.

R. VON REPPERT.
COMPUTING MACHINE.
APPLICATION FILED JULY 1, 1907.

PATENTED APR. 21, 1908.

15 SHEETS—SHEET 2.

Fig. 3.

Witnesses:
G. A. Pennington
A. O. Kurt

Inventor:
Richard von Reppert,
By Court Davis,
Attys.

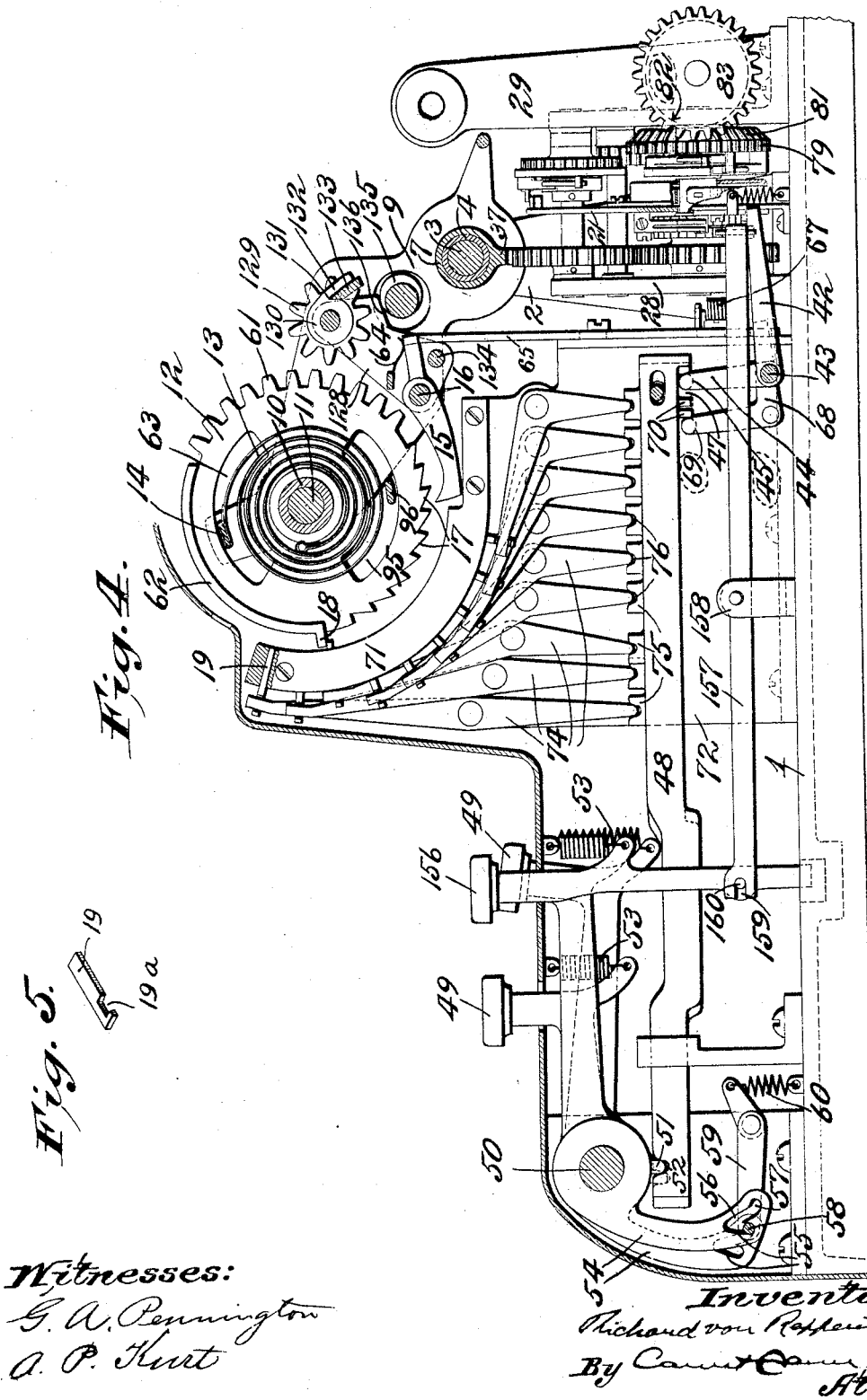

No. 885,522. PATENTED APR. 21, 1908.
R. VON REPPERT.
COMPUTING MACHINE.
APPLICATION FILED JULY 1, 1907.

15 SHEETS—SHEET 4.

Witnesses:
G. A. Pennington
A. P. Kurt

Inventor:
Richard von Reppert,
By Carrot Carr,
Attys

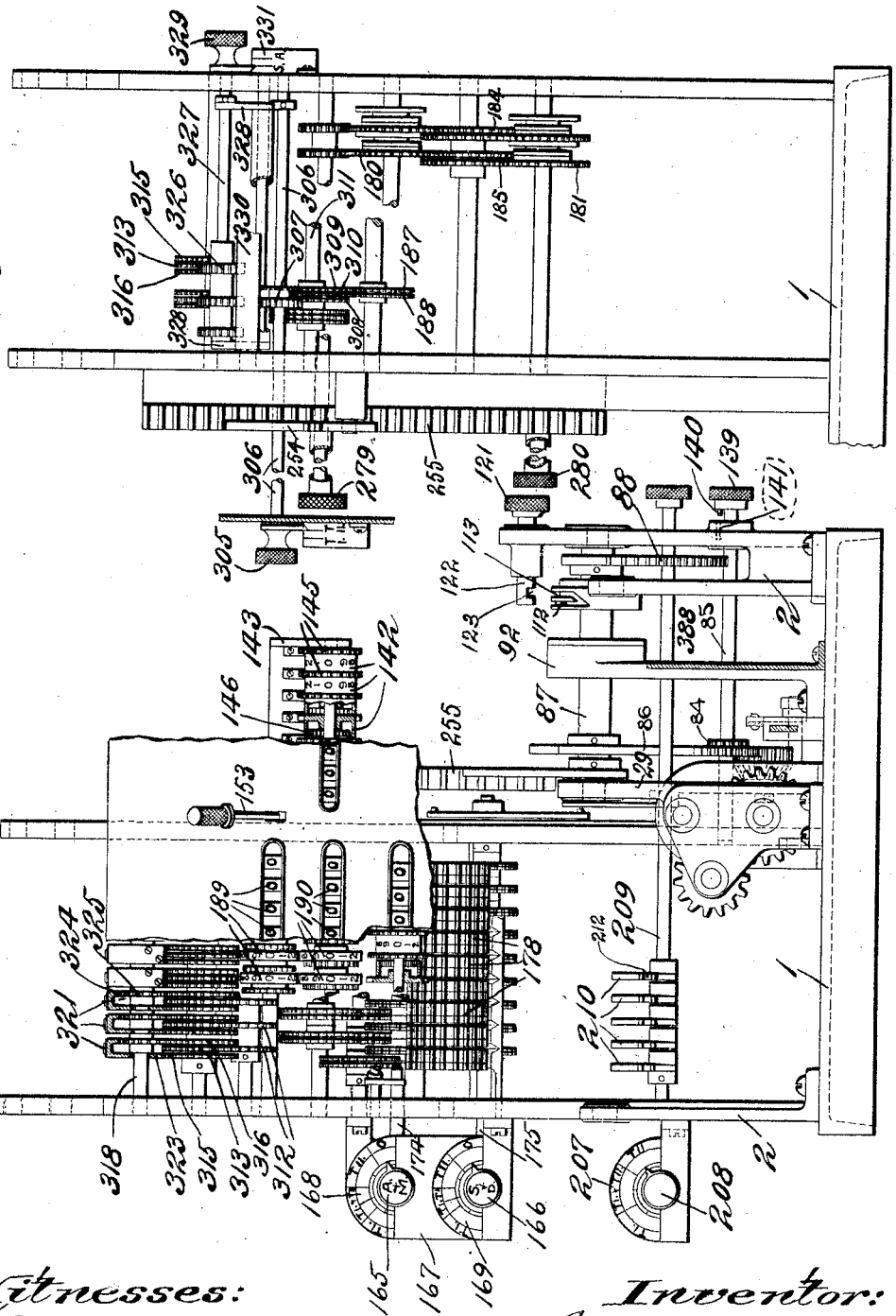

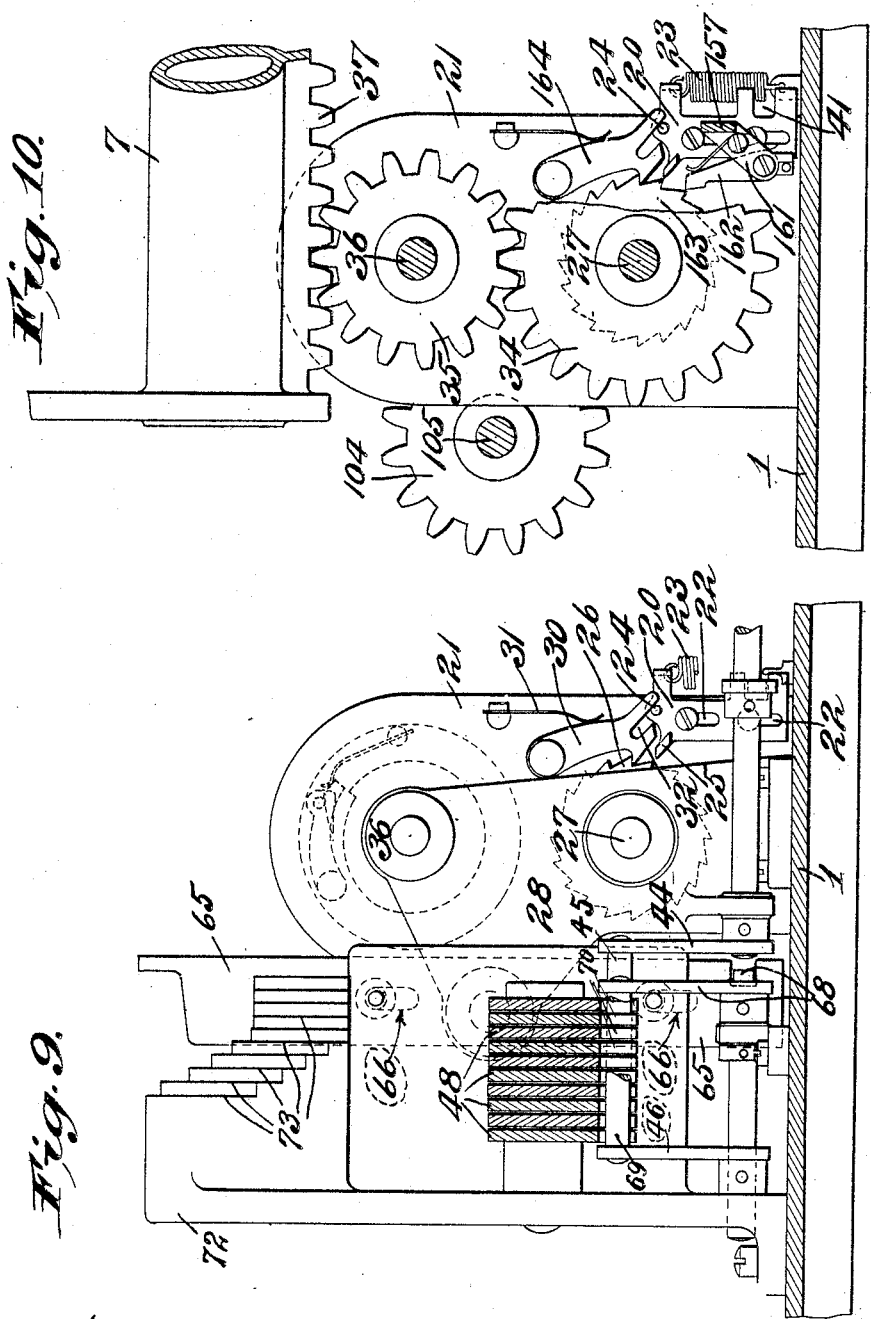

No. 885,522.
R. VON REPPERT.
COMPUTING MACHINE.
APPLICATION FILED JULY 1, 1907.
PATENTED APR. 21, 1908.
15 SHEETS—SHEET 7
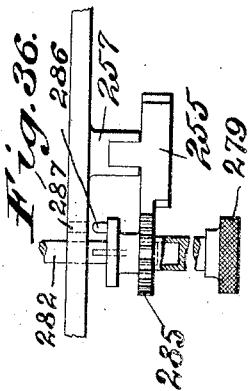
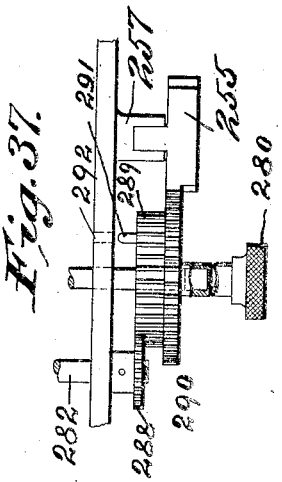
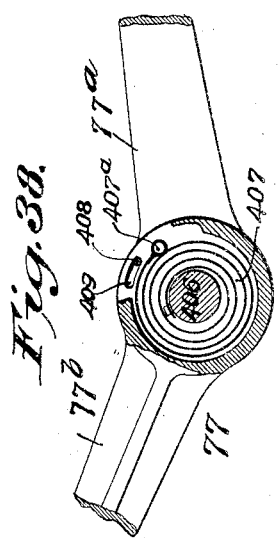
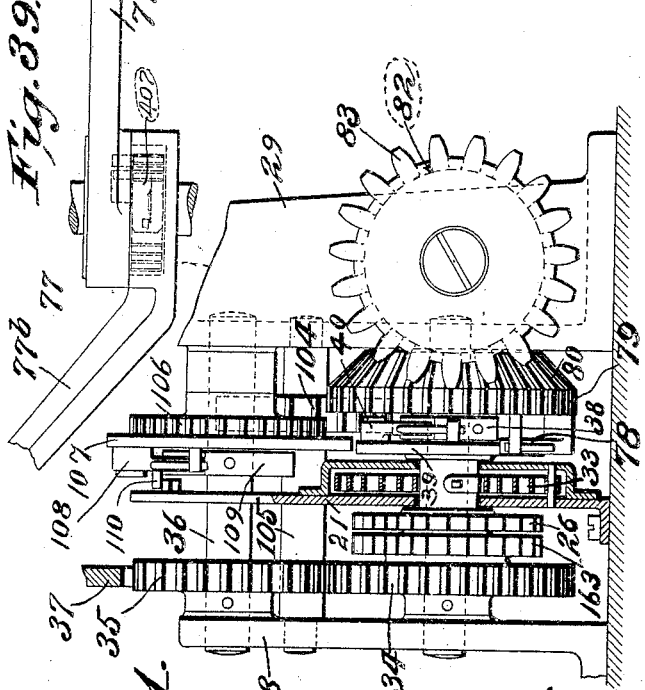
Witnesses:
G. A. Pennington
A. P. Kurt
Inventor:
Richard von Reppert,
By Court Gavin,
Attys.

No. 885,522. PATENTED APR. 21, 1908.
R. VON REPPERT.
COMPUTING MACHINE.
APPLICATION FILED JULY 1, 1907.
15 SHEETS—SHEET 8.
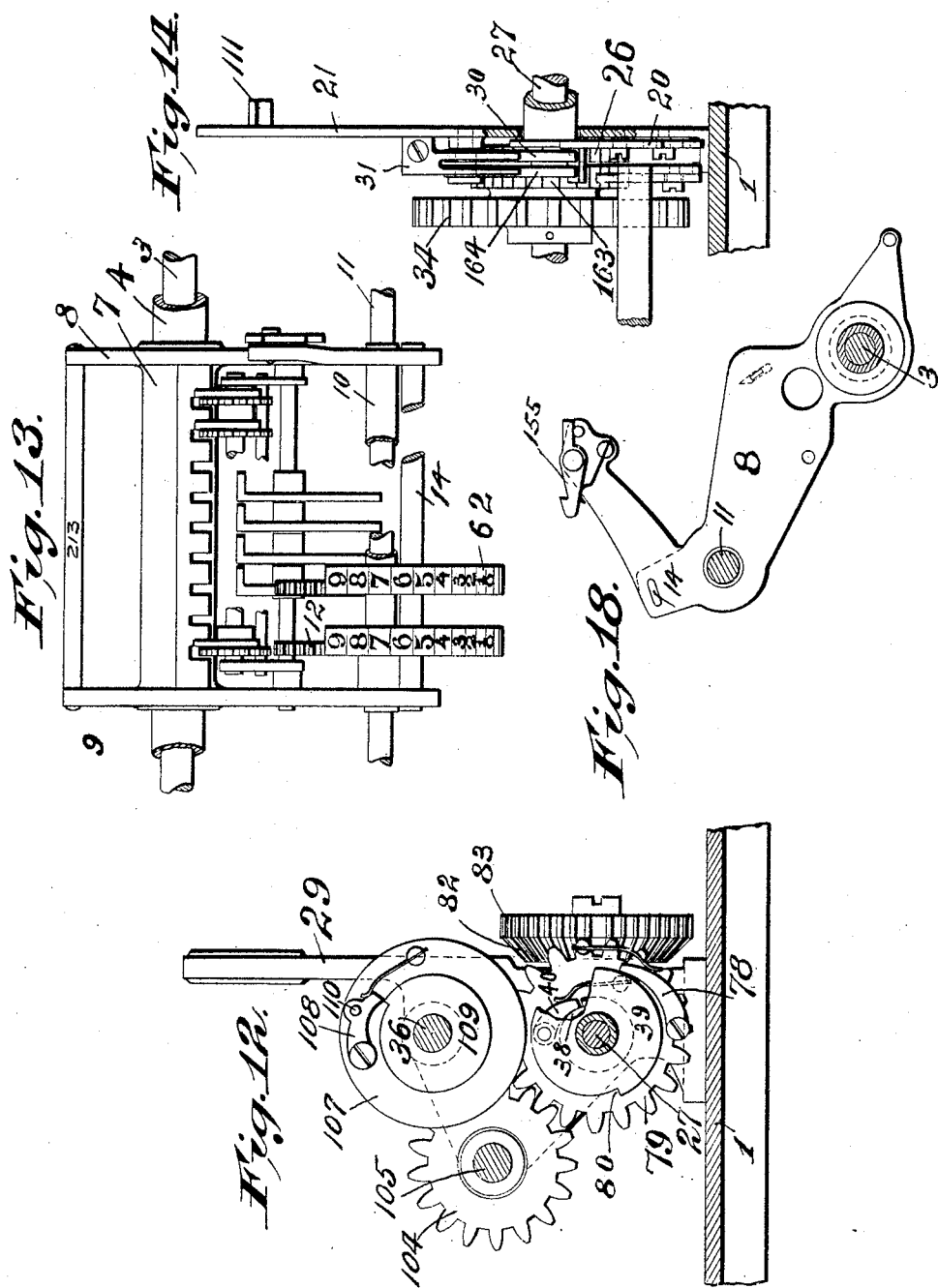
Witnesses:
G. A. Pennington
A. O. Kurt
Inventor:
Richard von Reppert,
By Cannet Janne,
Attys.

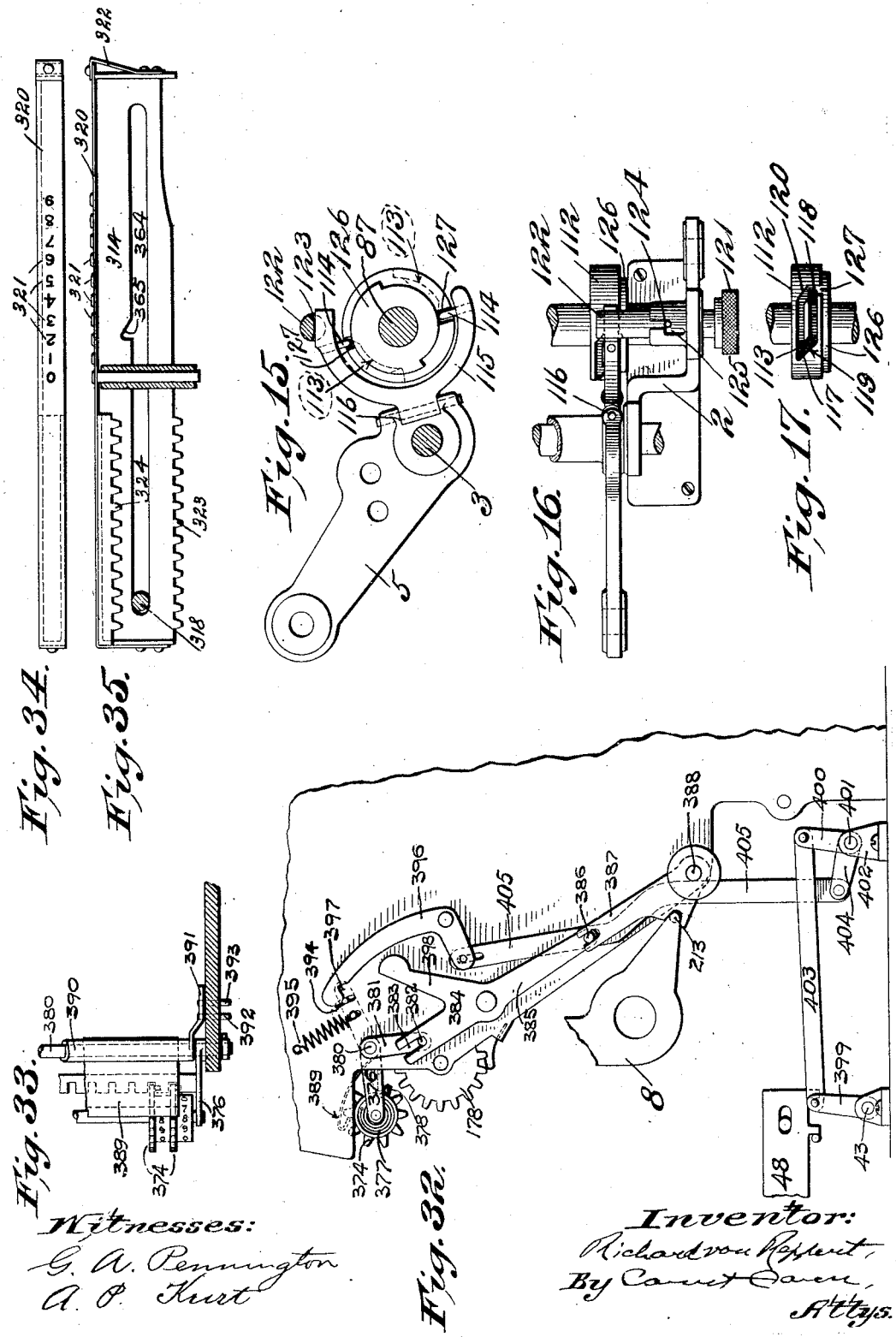

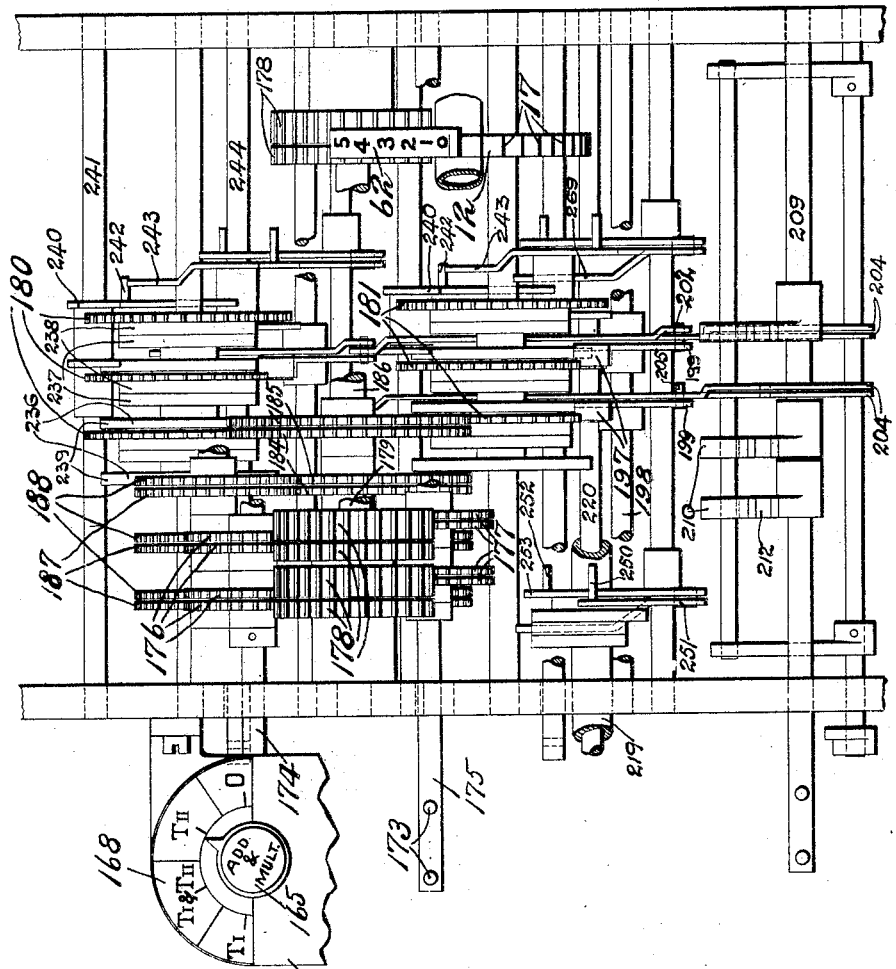

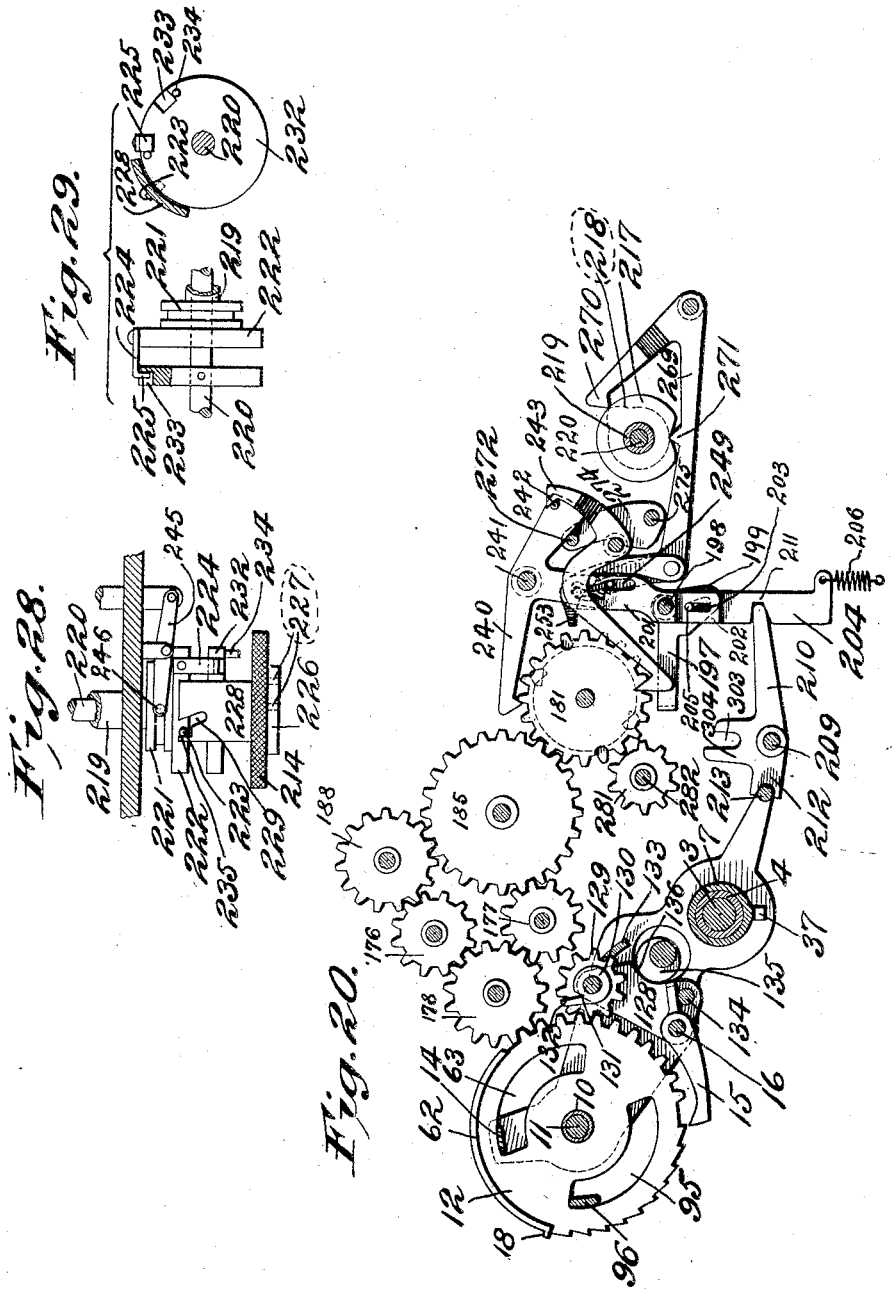

No. 885,522. PATENTED APR. 21, 1908.
R. VON REPPERT.
COMPUTING MACHINE.
APPLICATION FILED JULY 1, 1907.
15 SHEETS—SHEET 12.
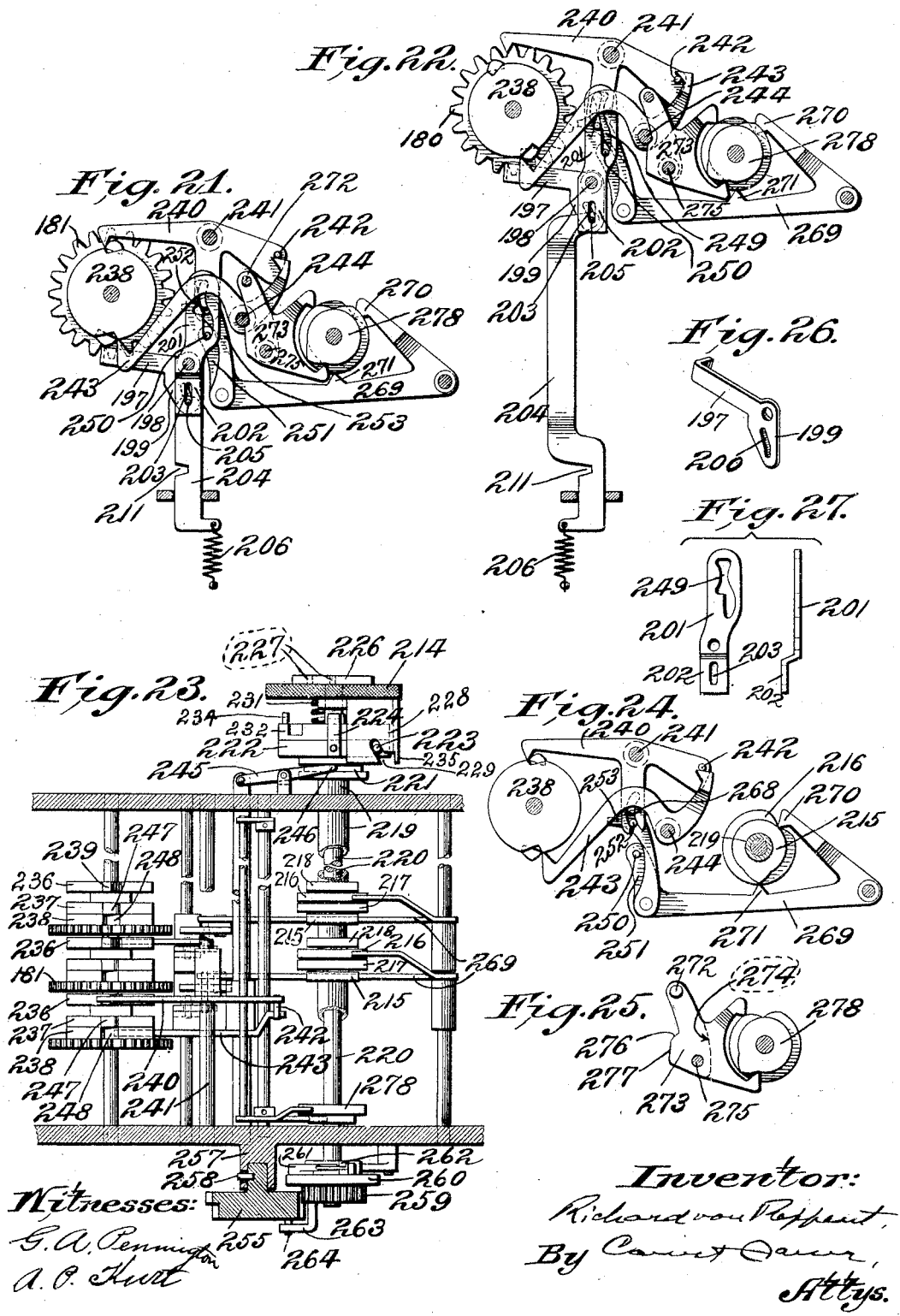

No. 885,522. PATENTED APR. 21, 1908.
R. VON REPPERT.
COMPUTING MACHINE.
APPLICATION FILED JULY 1, 1907.
15 SHEETS—SHEET 13.
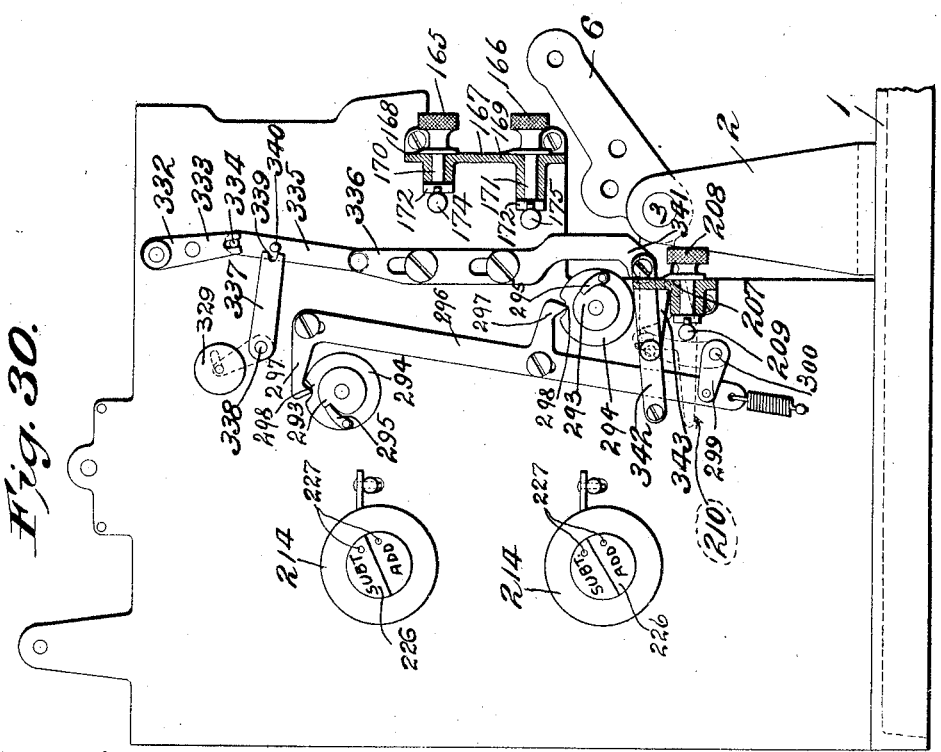

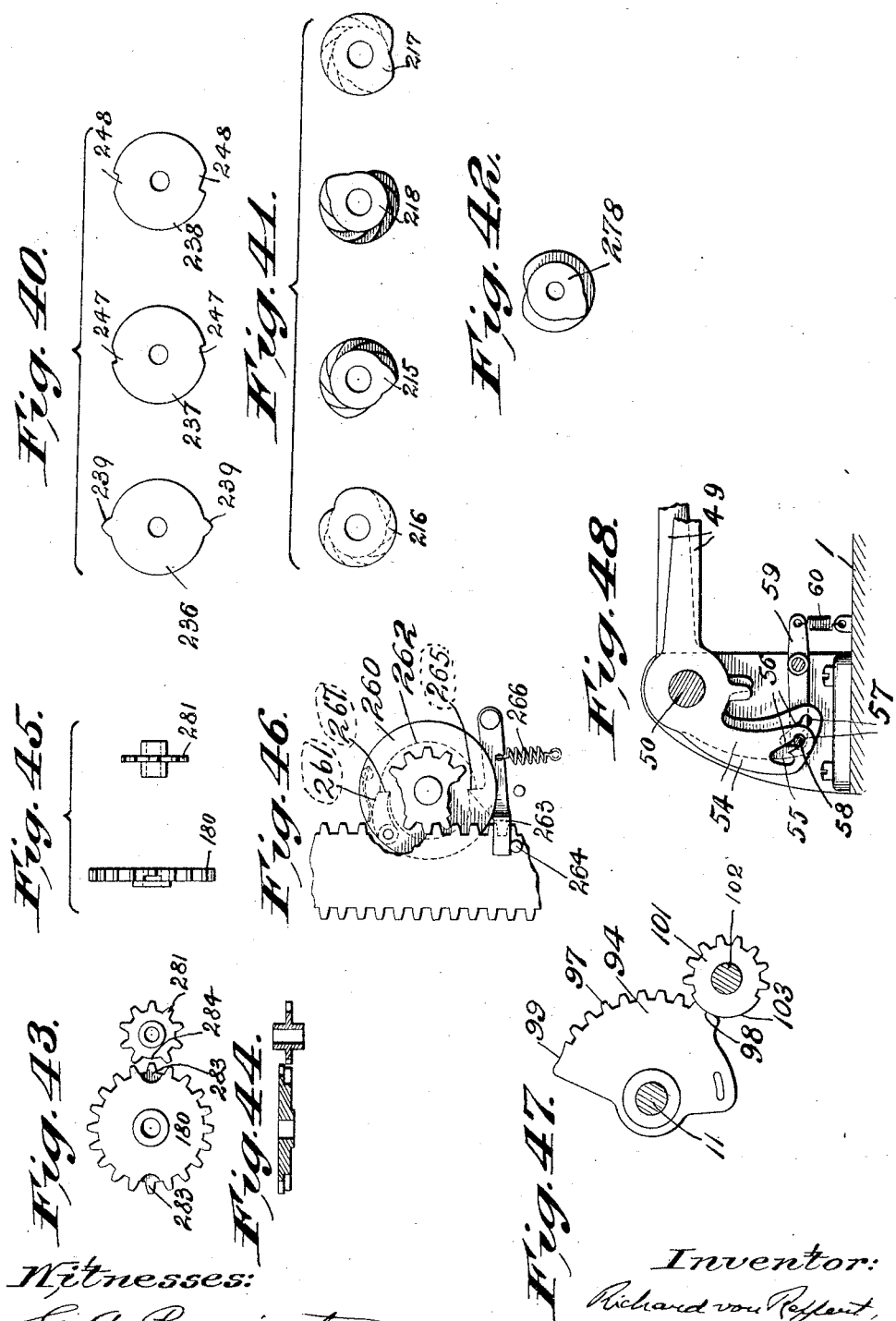

No. 885,522. PATENTED APR. 21, 1908.
R. VON REPPERT.
COMPUTING MACHINE.
APPLICATION FILED JULY 1, 1907.

15 SHEETS—SHEET 15.

Witnesses:
G. A. Pennington
A. P. Kurt

Inventor:
Richard von Reppert,
By Caust & Cann,
Attys.

UNITED STATES PATENT OFFICE.

RICHARD VON REPPERT, OF ST. LOUIS, MISSOURI.

COMPUTING-MACHINE.

No. 885,522.  Specification of Letters Patent.  Patented April 21, 1908.

Application filed July 1, 1907. Serial No. 381,635.

*To all whom it may concern:*

Be it known that I, RICHARD VON REPPERT, a citizen of the United States, and a resident of the city of St. Louis and State of Missouri, have invented a new and useful Improvement in Computing - Machines, of which the following is a specification.

My invention relates to computing machines and has for its principal objects to provide a machine having ten keys representing the digits "0" to "9" inclusive, the keys to be operated an equal distance and offering equal resistance, to induce movement of certain elements in proportion to the digits of the respective keys operated; to provide a machine having ten digits keys arranged to release certain elements and to limit the movement of said elements in proportion to the keys operated; said elements being entirely free to move until stopped, to thereby facilitate rapid succession of key operations; to provide a machine in which certain elements are moved proportionally by the operation of digit keys to represent an item, and having figures to show the item for the inspection of the operator; to so arrange the parts that the operation of setting the item mechanism to indicate an item will simultaneously position the item mechanism in proper coöperative relation to the totalizing mechanism preparatory to the entering of said item into the totalizing mechanism; to provide a key locking device whereby, during the operation of one key, all other keys are locked; to provide for the rewinding of the carriage escapement spring during the initial stroke of the item lever and by direct application of manual power, to said spring; to provide a machine arranged to be operated for addition, subtraction, multiplication and division; to provide an item retaining device adapted to be actuated during the operation of division and multiplication, to retain an item in the item mechanism for successive subtraction or addition; to provide a register adapted to be operated during the operation of division and multiplication, to register the figures comprising the quotient or the multiplier, respectively; to provide a dividing key to be used during operation for division, to move the divisor to the right for successive subtraction; to provide a totalizing mechanism of positive function throughout, which is positively locked in all positions, and is reversible for subtraction, all parts being permanently operatively connected and no resilient elements being employed to move parts or lock parts; thereby eliminating the possibility of an error; to provide a machine having an item mechanism and two totalizing mechanisms, each of said totalizing mechanisms being arranged to be operated for addition, subtraction, multiplication and division; to provide for the connection of either or both of said totalizing mechanisms with said item mechanism to permit a variety of useful combinations, for instance: to operate one totalizing mechanism for multiplication and the other for adding the products of said multiplication, as in billing; or, to add a column of items of two totals, or subtract the same from two totals; or simultaneously add an item to one total and subtract same from the other total; to provide a printing mechanism arranged to be connected to and disconnected from the computing machine proper; to provide a machine having a printing mechanism and two totalizing mechanisms, each totalizing mechanism being arranged to be actuated for addition and subtraction, and to provide connections whereby the item entered into either of said totalizing mechanisms may be printed; to provide a machine having a printing mechanism, two totalizing mechanisms, and a clearing device for each totalizing mechanism; to provide connections to clear said totalizing mechanisms separately or jointly, and to connect the printing mechanism with either of said totalizing mechanisms; to provide a printing mechanism, having type embossed on metal strips, to thereby reduce the number of parts and the mass in motion; to provide an operating lever having a speed regulator and a shock guard to avoid shocks to the parts actuated by said lever, and to regulate the speed with which the lever can be actuated in either direction; and to provide a machine having a secondary item indicator, to retain and show the last item entered into the machine; and other objects hereinafter more fully appearing.

The invention consists in the parts, and in the arrangements and combinations of parts hereinafter described and claimed.

Figure 49:
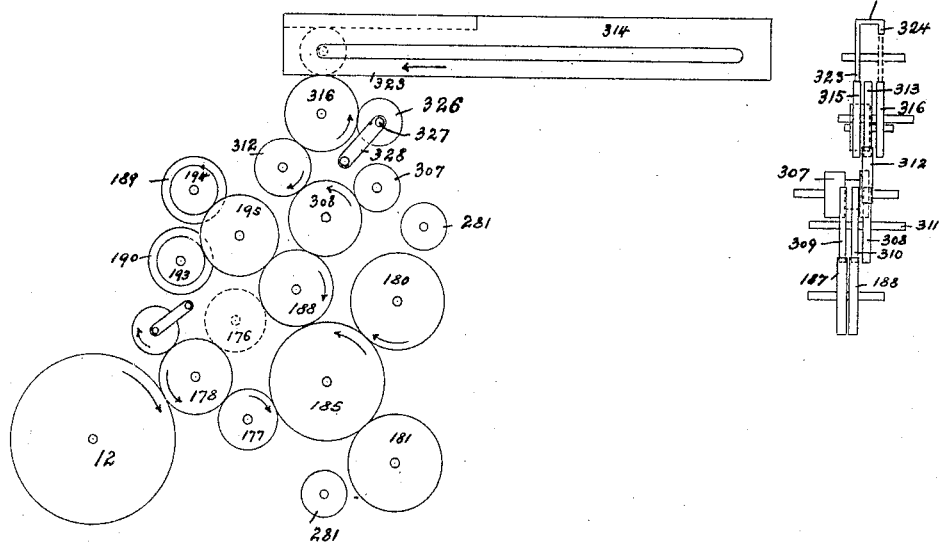
Figure 50:
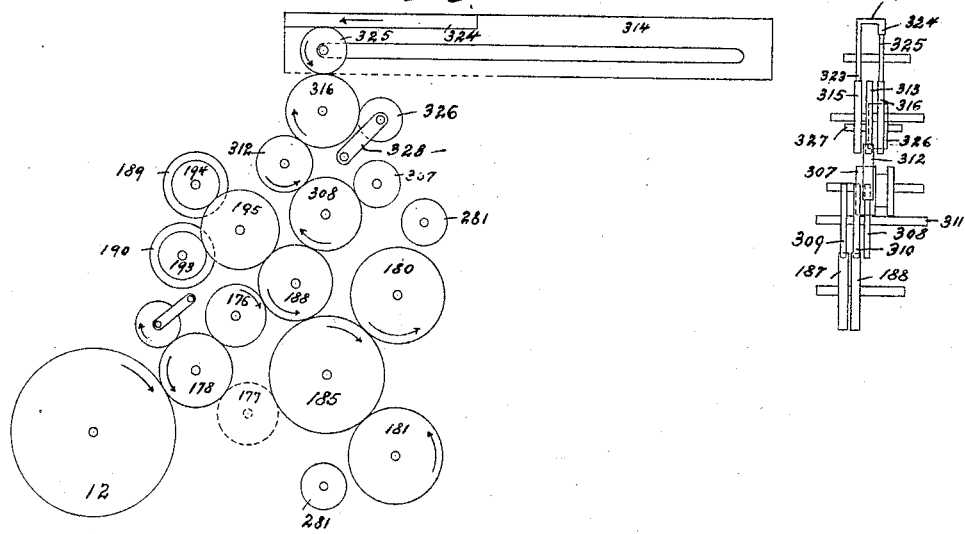

In the accompanying drawing, which forms part of this specification, and wherein like symbols refer to like parts wherever they occur, Figure 1 is a side elevation of the machine with a portion of the outer casing removed; Fig. 2 is a detail view of the speed regulator; Fig. 3 is a view partly in side elevation and partly in longitudinal section; Fig. 4 is an enlarged detail sectional view of the item mechanism; Fig. 5 is a detail of a limit stop; Fig. 6 is a plan view partly in section and with parts removed; Fig. 7 is a front elevation with parts removed; Fig. 8 is a rear elevation with parts removed; Figs. 9 to 14, inclusive, are enlarged detail views of portions of the item mechanism; Figs. 15 to 17, inclusive, are detail views of the item carriage oscillating device; Fig. 18 is a view of the right side plate of the item carriage; Fig. 19 is a front view of the totalizing mechanism with parts removed; Fig. 20 is an enlarged detail view showing a portion of the item mechanism operatively connected with a totalizing mechanism; Fig. 21 is a detail view showing the lower totalizing mechanism in normal position; Fig. 22 is a detail view showing the upper totalizing mechanism in set position; Fig. 23 is a fragmentary plan view of a totalizing mechanism; Fig. 24 is a detail view of the set mechanism and the actuating mechanism of a totalizer; Fig. 25 is a detail view of the restoring device of a totalizer; Fig. 26 is a detail view of a lock pawl; Fig. 27 is a detail view of a release lever; Figs. 28 and 29 are details of an adjusting device for a totalizer; Fig. 30 is a side elevation of the left side plate; Fig. 31 is an edge view of said left side plate; Fig. 32 is a detail view of the connections for the secondary item indicator; Fig. 33 is a detail view of the secondary item indicator; Figs. 34 and 35 are detail views of a type-bar of the printing device; Figs. 36 and 37 are detail views of the clearing devices for the respective totalizing mechanisms; Figs. 38 and 39 are detail views of the item lever shock guard device; Fig. 40 is a detail view of the set mechanism cams detached from a totalizing wheel; Fig. 41 is a detail view of the respective totalizing mechanism actuating cams; Fig. 42 is a detail view of the totalizing mechanism restoring cams; Figs. 43 to 45, inclusive, are detail views of a clearing pinion and its respective total wheel; Fig. 46 is a detail view of a limiting device for a totalizing mechanism; Fig. 47 is a detail view of an item wheel clearing sector and its respective actuating gear; Fig. 48 is a detail view of the key lock device; Fig. 49 is a schematic view showing the upper totalizing mechanism connected for "addition"; and, Fig. 50 is a schematic view showing the lower totalizing mechanism connected for "subtraction."

The present machine comprises an item mechanism adapted to be set by manually operable keys, a totalizing mechanism into which the item is transferred from the item mechanism and connections whereby the transfer of the item is made to perform the operation of addition, subtraction, multiplication or division, as desired. It also comprises a printing mechanism which is associated with the other operating parts of the machine in such a manner as to print all of the numbers involved in the various calculations and all of the entries required in billing accounts.

*Item mechanism.*—Upon the base plate 1 of the machine are mounted uprights 2 in which is journaled a shaft 3. (See Figs. 4 and 13.) Pivotally mounted on said shaft is a frame consisting of an elongated sleeve 4 journaled on said shaft and having arms 5 and 6, respectively, projecting radially therefrom. The sleeve portion 4 of said frame extends nearly the full length of said shaft and constitutes a support for a second sleeve 7 which is arranged to slide lengthwise thereof and which constitutes a member of the carriage frame of the item mechanism. This last mentioned sleeve 7 carries two transversely arranged side plates 8 and 9, respectively, which are connected by a tubular tie member 10, which in turn fits over and slides upon a supporting rod 11 provided therefor in the first mentioned frame. Pivotally mounted upon this tubular tie member 10 are a series of item wheels 12 each of which is rotatable separably. Each of the item wheels has a spiral spring 13, which is fixed at one end to the item wheel and at the other end to a bar 14 mounted on the side plates of the carriage frame. The item wheels 12 are normally held against the action of their spring by means of detents 15 pivotally mounted on a rod 16 supported in the side plates of the carriage frame and engaging ratchet teeth 17 formed on the periphery of the item wheels. By this arrangement, any item wheel which is disengaged from its detent is rotated by its individual spring. The rotation of the item wheel continues until a shoulder or projection 18 on the item wheel strikes against a limiting stop provided for the purpose. Preferably, the limiting stops are movable pins or pieces 19 arranged to be set or positioned by the operator. In the construction shown in Fig. 4, the number of limiting stops is one less than the number of keys on the keyboard. These stops are connected through intermediate devices with their respective keys and the several stops are so positioned as to make the movement of the item wheel proportional to the digits represented by the several keys.

*Carriage escapement.*—The lateral movement of the carriage is effected step by step, by means of a spring which is permitted to act through an escapement mechanism, which escapement in turn is arranged to be released step by step by the key mechanism. This escapement mechanism comprises a plate 20 mounted to slide vertically on a housing 21 which is fixed on the base plate 1 of the machine. (See Figs. 9 and 10.) In order to permit said plate to slide it is provided with one or more vertically elongated slots 22 through which extend headed screws into the side of said housing. Said plate 20 is normally held in its lowermost position by means of a tension spring 23 which pulls it down until the upper end of the slots 22 bear against the securing screws. Said plate is provided with a pin 24 projecting from the face thereof and with a tooth or detent 25 projecting from the edge thereof. Said tooth 25 is normally held in position to normally clear the teeth of a ratchet wheel 26 which is loosely mounted on a shaft 27 that is journaled in brackets or uprights 28 and 29, respectively, mounted on the base plate 1 of the machine; but when the plate is raised, said tooth engages with a tooth of said ratchet wheel 26. Pivotally mounted on the side plate of said housing is a downwardly extending pawl 30 which is normally pressed by a spring 31 into engagement with said ratchet wheel 26. The lower end of this pawl has an elongated slot 32, the upper edge of which lies across the path of the pin 24 on the plate 20.

The ratchet wheel is provided with a spiral spring 33 fixed thereto at one end and fixed at its other end to the housing 21. In consequence of this arrangement, the upward movement of the plate 20 causes its pin 24 to bear against the upper inclined side of the slot 32 of the pawl 30. At the same time, a tooth of said ratchet is disengaged from its locking pawl so that the spring 33 is ineffective to rotate said ratchet wheel. During the downward movement of said plate 20, the ratchet wheel follows the tooth on said plate, but before the ratchet wheel is disengaged from said tooth, the lock pawl engages the next succeeding tooth of said wheel. Thus, for each reciprocation of the plate, the ratchet wheel is rotated a single step or tooth. The movement of the ratchet wheel thus permitted is transmitted to the item carriage by the following means: Fixed on the end of the shaft 27 (see Fig. 10) upon which the ratchet wheel is loosely mounted is a gear wheel 34 which meshes with an intermediate gear 35 fixed on a shaft 36 which is journaled in the uprights 28 and 29, and which meshes with a rack 37 formed on the under side of the sleeve 7 of the carriage frame. In order to transmit motion from the ratchet wheel 26 that is loose on the shaft 27 and the gear that is fixed on said shaft, the shaft has a notched disk 38 fixed thereon, and the hub of the ratchet wheel is provided with a disk 39 carrying a spring-pressed pawl 40 which bears against the periphery of the first mentioned disk 38 so as to coöperate with the notch or shoulder thereon. By this arrangement, the item carriage is moved laterally step by step past the item setting mechanism, each step bringing a new item wheel into operative relation with the item setting mechanism and increasing the number of the order of the figure in the completed item.

The carriage escapement is operatively connected to all of the digit keys so as to be actuated whenever any of the digit keys is manipulated. The release plate 20 of the escapement mechanism has a recess 41 in its side through which projects the end of a rock arm 42. (See Figs. 4 and 9.) Fixed to the shaft 43 of the rock arm 42 is a second arm 44 which is connected by a cross rod 45 to an arm 46 that is pivotally mounted on the same axis with said shaft. The cross rod 45 is operatively connected to all of the digit key bars, as for instance, by extending through the recesses 47 in the lower edge thereof. The key bars in turn are arranged to be manipulated by the keys as hereinafter described.

*Digit keys and lock.*—There is one key bar 48 for each of the digit keys and they are arranged to slide horizontally. The several digit keys 49 (see Fig. 4) are pivotally mounted on a shaft 50 and each has a projection 51 arranged to coöperate with a notch or groove 52 on the top edge of its respective key bar 48. Each of the digit keys 49 is provided with a reciprocating spring 53. Each of the digit keys has an extension 54 which is provided with a slot of peculiar shape and so designed as to prevent the manipulation of a second key before a previously operated key is returned to its normal position. This slot comprises three portions, namely, an elongated radial portion 55 from whose upper end an eccentric portion 56 extends rearwardly and downwardly and the eccentric portion terminates in a circular portion 57 concentric with the axis of the key levers. The slots of the several key levers are in alinement and through them extends a cross bar 58 which is mounted upon elongated pivotal arms 59 and is normally held in its uppermost position by means of a spring 60. In consequence of the form of the slot in the key lever extensions, the manipulation of the key levers has the effect of bearing the front edge of the eccentric portion of the slot against said cross rod, causing said cross rod to move downwardly to the bottom of the elongated radial portion of the slots in all of the other key levers. In this position, the rearward side of the slot prevents the manipulation of any other key.

*Item wheels.*—There are as many similar item wheels as the highest order of a number the machine is intended to operate upon. The machine shown has nine item wheels and is intended to operate upon numbers of any order up to the ninth. Each item wheel 12 (see Figs. 4 and 13) is provided with ratchet teeth 17 over about one third of its periphery and with gear teeth 61 extending over about one third of its periphery and with a flange 62 which extends over the remaining portion of the periphery and upon which numbers are placed. At the end of said flange is the out-turned portion or projection 18 intended to coöperate with the limiting stops 19 hereinafter described. The numbers on the item wheels serve to show the item set up, as will be explained below. Each of the item wheels is provided with a spiral spring 13 which is connected at one end to the item wheels and at the other end to a bar 14 arranged parallel with the shaft and hereinafter referred to as the spring bar. In order to accommodate this bar, the several item wheels are skeletonized or have concentric slots 63 cut therein to permit the bar to extend therethrough. In the normal position of the item wheels, the end of the slots bear against the spring bar 14 which thus serves to limit or position the item wheels. The springs 13 tend to turn the item wheels out of their normal position. The item wheels are held in their normal positions by means of the detents 15 of which there is one for every item wheel, and which detents are held in engagement with the wheels by springs 64.

*Item wheel release.*—To release the detents which hold the item wheels in their normal positions and permit rotation of the item wheels by their springs, the following means are provided: A laterally extending portion of the upright frame of the item mechanism has a plate 65 mounted thereon to reciprocate vertically. For this purpose, the plate is provided with vertically (see Fig. 4) elongated slots 66 through which extend headed bolts or screws, which serve to mount it in place and act as guides therefor. The upper end of this plate is in position to bear against each of the detents of the item wheels in turn when the item carriage is moved laterally, but normally said plate is held in its lower position out of engagement with said detents by a spring 67. The detent-releasing plate has a recess in its lower end in which is seated one end of a bell-crank lever 68 upon whose other end is mounted a cross-rod 69 which normally lies transversely of the key bars in position to be actuated by projections 70 thereon. Each of these key bars, with the exception of the zero key bar, is provided with such a projection.

*Item wheel limiting device.*—To set an item wheel to indicate any given digit it is rotated through an angle which is proportional to the amount of the digit. The amount of rotation of the item wheels is determined by the series of stops 19 which are controlled by the key levers. (See Fig. 4.) The item wheels successively move into the plane of the series of stops as the carriage moves from right to left. Each item wheel has a radial projection 18 at the lower end of its flange which projects far enough to engage any one of the stops which may be moved out of its normal position. The stops are small plates mounted in a curved block 71 concentric with the item wheels (see Fig. 1). There are nine stops, one for each digit except zero, and they are spaced apart an angular distance equal to the angular movement of the item wheels when rotated one tooth. The stops are moved into the path of the projection of the item wheel by the key levers by means of intervening connecting devices. A bracket or upright 72 is provided with series of offset seats 73, one for each key lever representing a digit. Upon said upright are pivoted a series of levers 74, one for each stop and key bar 48. Each key bar representing a digit, except the zero key bar, is provided with an upwardly extending projection 75 in which is a recess 76 which constitutes a seat for the end of the corresponding lever. The upper ends of the respective levers pass through slots or recesses 19$^a$ provided therefor in the outer ends of the limit plates 19.

*Operation of setting up an item.*—The operation of setting up an item is as follows: Assume the number to be set up to be 905. At the beginning of the operation the item wheels stand with ends of their slots 63 bearing against the spring bar 14 and with the zero visible through the inspection panel. All of the limiting plates are retracted and the first item wheel at the left is in the vertical plane thereof. The detent of said item wheel, that is, the first item wheel at the left, is vertically above the detent disengaging plate. The escapement spring is wound up and the escapement pawl 30 is in engagement with the ratchet wheel 26, and the escapement disengaging plate is in its lowermost position.

In setting up the item, the keys are to be operated just as if the numbers were to be written on the typewriter. Therefore, the "9" key will be operated first. First, the "9" key moves downwardly, its projection 54 bears the key bar forwardly and the recess on the upper edge of the key bar 48 oscillates its lever 74 to press its limiting plate 19 inwardly into the path of the projection 18 on the item wheel. At the same time the forward movement of the key bar, acting against the cross rod 45 of the arms 44 and 46, oscillates the shaft 43 and through it the rock arm 42. The rocking of the rock arm lifts the escapement disengaging plate 20 so as to simultaneously bring its tooth 25 into position to engage with the ratchet wheel and cause its pin 24 to bear against the lock pawl 30 and disengage said lock pawl from the ratchet wheel 26. When the escapement disengaging plate goes back to its lower position, the spring of the ratchet wheel forces said ratchet wheel to follow for a space of one tooth. This movement of the ratchet wheel carries with it the disk 39 fixed to it and the movement of said disk is transmitted through the pawl 40 fixed to said disk to the notched disk 38 which is fixed to the shaft 27 of the gear wheel 34. The gear wheel is thus rotated through the space of one tooth and its movement is transmitted to the intermediate gear 35 and thence to the rack 37 formed on the sleeve 7 of the carriage. At the same time, the forward movement of the key bar causes the tilting of the bell-crank lever 68 so as to raise the end thereof which coöperates with the detent disengaging plate 65. The lifting of the detent disengaging plate causes the upper end thereof to bear against the detent 15 of the first item wheel to the left, that is to say, the item wheel which is in the plane of the limiting plates 19. The disengaging of the detent from the item wheel permits the spring 13 of the item wheel 12 to rotate said wheel, and this rotation continues until the radial projection 18 on the periphery of said item wheel strikes against the limiting plate that had been set by the digit key, that is to say, the item wheel, in the example cited, rotates through nine spaces and is stopped by the plate corresponding to the "9" key. During this operation, all of the digit keys with the exception of the "9" key, are locked against manipulation by reason of the eccentric portion of the slot of the "9" key having pushed the locking rod downwardly into the bottom of the radial portion of the slots of all of the other digit keys.

The result of the operation just mentioned is that the first item wheel to the left has been rotated through nine unit spaces, and the entire item carriage has traveled one space to the left so as to bring the second item wheel into the plane of the limiting plates, and in other respects all of the parts are in normal position. As the normal position is the zero position, it only remains to shift the carriage one step to the left without any rotation of the item wheel. For this purpose, the "zero" key is depressed and it causes the same locking operation and transmits movement to the escapement mechanism in the same way as above explained with reference to the actuation of the "9" key. As there is no occasion to rotate the item wheel, however, the zero key bar is not provided with an operative connection with the rock lever 68 which actuated the detent disengaging plate. Consequently, the item wheel remains in its normal position while the item carriage moves bodily one step to the left leaving all of the parts otherwise in normal position, bringing the third item wheel into the plane of the limiting plates and leaving all of the other parts otherwise in normal position. The "5" key is now manipulated causing exactly the same actuations and operations as in the case of the "9" key except of course that instead of the limiting plate corresponding to the digit 9, the limiting plate corresponding to the digit 5 is actuated to limit the rotatory movement of the third item wheel.

*Escapement spring rewinding.*—As stated above, the item carriage is moved laterally by the power furnished by the spring 33. This spring is rewound during the initial stroke of the item lever 77 (see Fig. 1) whereby manual power is utilized instead of depending upon the power of a retracting spring. For this purpose, the following mechanism is provided. Upon the periphery of the disk 39 bears a spring actuated pawl 78 (see Fig. 11) which is mounted upon the face of a gear wheel 79, whereby the rotation of the gear wheel engages the pawl against a shoulder 80 on said disk 39 and thereby causes the rotation of said disk and of the ratchet wheel 26 to which it is fixed. The gear wheel 79 is fixed to or is integral with a bevel gear 81 loosely mounted on the shaft. This bevel gear meshes with a second bevel gear 82 integral with the gear wheel 83 that is loosely mounted on a stud or short spindle that is mounted in the uprights 29 above mentioned. This last mentioned gear wheel 83 meshes with a gear wheel 84 (see Figs. 6 and 7) fixed on a shaft 85 that is journaled in the right side plate and in the upright 2 that is located at the right side of the machine. This last mentioned gear 84 meshes with a sector 86 that is fixed on a shaft 87 that is journaled in said last mentioned upright 2 and bracket 29 and carries a second sector 88 which is located in the plane of the end of the item lever and meshes with a sector 89 formed thereon. By this arrangement, a continuous train extends from the rack or sector on the end of the item lever to the gear wheel which carries the pawl that rides in the periphery of the disk which is fixed to the ratchet wheel of the escapement and to which the spring is fixed. In the normal operation of the device, the item carriage actuating spring moves the shoulder 80 of the disk 39 step by step towards the pawl on the gear wheel 79. When the item lever is manipulated said pawl is moved forwardly against the shoulder on the disk and causes the rewinding of said spring.

*Clearing of item wheels.*—The item lever comprises two members 77ª and 77ᵇ which normally operate as a unit. (See Figs. 1 and 6.) This lever is pivotally mounted in brackets 90 on the base 1 of the machine. The front member 77ª is arranged to be depressed and the rear member 77ᵇ terminates in the gear sector 89. This second sector 89 engages the sector 88 mounted on the shaft 87 journaled in brackets 2 and 29. A main spring 91 is suitably mounted in a housing 92 and one end is affixed to said shaft 87 and the other end to the said housing. The function of this spring is to retract the lever to normal position after same has been depressed.

The carriage supporting brackets 2 carry the rotatably journaled shaft 3 as before described. Affixed to each end of this shaft is a gear 93 and the gear on the right is in mesh with the aforesaid item lever sector 89. Sectors 94 are mounted on the rod 11 secured on oscillatory arms 5 and 6. The item wheels are provided with slots 95 and a cross bar 96 extends through said slotted portion of said item wheels and is fastened at each end in said sectors 94. Said sectors have on their periphery gear teeth 97 and two concavities 98 and 99. (See Figs. 1 and 47.) Two rigidly connected gear wheels 100 and 101, respectively, are loosely journaled on a stud 102 on said arms 5 and 6. The gears 101 are mutilated gears and are arranged to mesh with the sectors 94 and have a portion of their teeth displaced by a convexity 103 fitting the concavities 98 and 99 and said sectors 94. The gear wheels 100 are in mesh with the gear wheels 93 which are rigidly mounted on the shaft 3. The parts just described are so arranged that a depression of the item lever causes the gear wheels 93 to rotate the gears 100 and 101, the convexity 103 on the gears 101 thereby rotating in the concavity 98 on sector 94 until the teeth on said gears 101 engage the teeth on said sector and rotate the same until said convexity 103 on the gear 101 engages the concavity 99 on said sector. The rotation of these sectors 94 causes the cross bar 96 to describe an arc, thereby engaging and rotating to normal position any item wheels that are out of normal position.

*Retracting of carriage.*—The depression of the item lever causes rotation of the beveled gear 81 and gear 79, as stated above. A gear 104 is mounted on a shaft 105 which is journaled in brackets 28 and 29 and is arranged to mesh with said gear 79. A gear 106 carrying a pawl disk 107 and a pawl 108 is loosely mounted on the shaft 36 which is journaled in brackets 28 and 29. Rigidly mounted on said shaft is the gear wheel 34 which meshes with the carriage rack 37. Rigidly mounted on said shaft 36 is the notched disk 109. The aforesaid pawl 108 is arranged to engage a notch in said disk 109 and has a pin 110 which normally rests on an inclined projection 111 affixed to the spring housing 21, thereby holding said pawl 108 out of engagement with said notched disk 109. The parts just described are arranged to operate as follows: The operation of the keys causes lateral travel of the carriage and a rotary movement of the gear 34 and the notched disk 109.

A depression of the item lever causes rotary movement of the gear 106, in the same direction as the rotary movement of the gear 34 and the notched disk 109 which is caused by the key operation. (See Figs. 11 and 12). The pawl 108 affixed to said gear 106 rides on the periphery of the notched disk 109 until it passes the notch in said notched disk. The return stroke of the item lever caused by the retracting spring 91 causes rotary movement of the gear 106 in the opposite direction. The pawl 108 during this movement engages the notched disk 109 and rotates the same to normal position, thereby bringing the carriage to normal position. In the last period of this movement the pawl 108 is again disengaged from said notched disk by the pin 110 traveling up on the inclined projection 111. During this return movement of the carriage, the ratchet 26 rides under the retaining pawl 30, and is then reëngaged by same and held in normal position.

*Carriage oscillating mechanism.*—The initial portion of the initial stroke of the item lever causes the item wheel carriage to be oscillated, to thereby engage the item wheels with the totalizing mechanism. During the remainder of the initial stroke the item wheels are cleared as described and the clearing movement is transferred to the totalizing mechanism. The initial portion of the return stroke of the item lever causes the item wheel carriage to oscillate back to normal position, thereby disengaging the item wheels from the totalizing mechanism.

Mounted on a shaft 87 (see Figs. 6, 15, 16 and 17) is the oscillating cam disk 112, having two diametrically located grooves 113 arranged to be engaged by two pins 114 on the yoke 115. The yoke 115 has a hinge connection 116 with the oscillating arm 5. Each cam groove has two eccentric surfaces or risers 117 and 118 in different vertical planes and two laterally acting cam surfaces 119 and 120 to oscillate the yoke on its hinge laterally and said yoke and arm 5 vertically.

The parts just described are so arranged that the initial portion of the initial rotation of the cam disk 112 oscillates the carriage and holds it in position during the remainder of the initial rotation; the initial portion of the return rotation causes an oscillation of the carriage to normal position and holds it in normal position during the remainder of the return rotation.

*Error knob.*—In case of striking a wrong key, it is desirable to operate the item lever and clear the item wheels without transferring the item to the totalizing mechanism. This is accomplished by preventing the oscillatory movement of the carriage during the clearing movement of the item wheels by means of a knob 121 mounted on a bracket 2. (See Figs. 6, 15, 16 and 17). The knob 121 is fastened on a shaft 122 which is rotatably and slidably mounted in a bracket 2. A recess 123 is cut into said shaft 122 and the upper arm of the yoke 115 engages said recess. Said knob shaft 122 has a pin 124 which is guided in a slot 125 cut in the shaft bearing on bracket 2. The pin 124 is arranged to normally limit the sliding movement of the shaft 122. A disk 126 is attached to the side of the oscillating cam disk 112 and openings 127 are cut into the side of the disk 112, entering the groove 113 in that portion where the pins on yoke 115 normally stand.

The parts just described are arranged so that an actuation of the knob 121 moves the pins 114 on said yoke 115 through said openings on to the periphery of said disk 126 and in this position the oscillating frame is locked against oscillating movement.

*Multiplying and dividing devices.*—Division and multiplication are based, respectively, on successive subtraction and addition. It is, therefore, desirable to retain the item representing the divisor or the multiplicand in the item mechanism and thereby avoid a repeated restriking of said item on the keys.

A swing frame comprising two side plates 128 (see Figs. 4, 13 and 20) is pivotally mounted in the item wheel carriage and it contains a number of pinions 129 to engage the item wheels 12. Fastened to each pinion 129 is a limit disk 130 having a recess 131 and a projection 132, the recess being arranged to engage a cross bar 133, which is fastened in the item wheel carriage. The swing frame has a shaft 134 mounted in its side plates 128 and extending under the rear ends of the retaining pawls 15. An eccentric shaft 135 is revolubly mounted in the side plates 5 and 6 and passes through the item wheel carriage and is also arranged to engage radial edge portions 136 of the swing frame side plates 128. Rigidly mounted on said eccentric shaft is a pinion 137 which meshes with a manually operable sector 138. These parts are so arranged that an operation of the sector 138 rotates the eccentric shaft 135, which thereby operates the swing frame and causes the pinions 129 to engage with the item wheels. The oscillation of the swing frame causes the recesses 131 on the limit disks 130 to disengage from the cross bar 133, but the projection 132 on the said limit disks 130 remains in contact with the cross bar 133, thereby preventing rotation of the item wheels. The retaining pawls 15 for the item wheels are disengaged by the shaft 134 of the aforesaid swing frame during this oscillatory movement. The sector 138 is operated in case of multiplication or division after an item has been struck on the keys to cause the item wheels to be rotated back to normal position and back again to the position to which they had been set by the operation of the keys, thereby avoiding the necessity of restriking the item.

*Carriage-disconnecting knob.*—To retain the item wheel carriage in the lateral position in which it has been set by the operation of the keys, a knob 139 is mounted on the shaft 85. (See Figs. 6 and 7.) The gear 84 mounted on said shaft 85 connects the sector 86 with the carriage returning mechanism as described above. An operation of said knob 139 slides the gear 84 out of mesh with said sector 86 and a pin 140 on said knob enters a hole 141 in said bracket 2 thereby locking the carriage returning mechanism.

*Register.*—In order to show the result of division or the "multiplier" in multiplication, a series of register disks 142 are mounted in a casing 143 which is fastened to the right side plate of the machine. (See Figs. 1 and 7.) Each register disk 142 has a limit pin 144, a ratchet 145, and a spring 146 which tends to hold it in normal position. A zero or limit plate 147 is mounted in said casing and the pin 144 is held against it by the spring 146. A series of bifurcated retaining pawls 148 are pivotally mounted on a shaft 149 in said casing 143. Said shaft carries on each end a rock arm 150. A shaft 151 passes through the bifurcated part of pawls 148 and is mounted on the lower ends of said rock arms 150. The left arm 150 has an upward extension and a pin 152. A manually operable lever 153 is pivotally mounted on said casing 143 and has an eccentric slot 154 to engage the pin 152 on said arm 150. Each pawl has a spring tending to engage said pawls with the ratchets 145 on said register disks. The carriage plate 8 (see Fig. 18) carries a feed pawl 155 arranged to engage the ratchets 145 on said disks 142 whenever said carriage is moved to engage with the totalizing mechanism. These parts are so arranged that an operation of the lever 153 oscillates the arms 150, the shaft thereby swinging forward and permitting the pawls 148 to engage the ratchet 145. Every engaging movement of the carriage will then cause the feed pawl 155 to move the corresponding disk one tooth, where it will be held by the pawl 148. The operation being completed, the lever 153 is moved to normal position, whereby all of said pawls 148 are disengaged from the ratchets 145. The register disks will then be moved to normal position by their springs 146.

*Dividing key.*—To move the carriage to the right during operation, for division, a dividing key 156 is provided. (See Figs. 4 and 6.) The same is denoted on keyboard with the letter "D" and is slidingly mounted in the keyboard and in the base plate. A spring $53^a$ tends to hold the dividing key in upper normal position. A horizontal lever 157 is fulcrumed in a bracket 158 mounted on the base plate and the front end has a slot 159 which engages a pin 160 on the key stem. The rear portion of said lever is bent and on this bent portion 161 is a spring pressed pawl 162. (See Figs. 10 and 14.) The pawl 162 is arranged to engage ratchet 163 fixed to the gear 34 similar to the ratchet 26 and adjacent thereto. A spring pressed pawl 164 similar to pawl 30 is mounted on the housing 21 and adjacent to said pawl 30. This pawl 164 is arranged to engage the ratchet 163 and is adapted to be actuated by the pins 24 and tooth 25 on the plate 20. The pawl 162 is normally out of engagement with the ratchet 163. These parts are so arranged that the operation of the key 156 causes the pawl 162 to engage the ratchet 163 and move the same one tooth, thereby moving the carriage one order to the right, the ratchet riding over the pawl 164 which reëngages said ratchet and holds it in position.

*Totalizing mechanism connections.*—I have provided this machine with two separate totalizing mechanisms in order to increase its usefulness for commercial purposes. For instance, to operate one totalizing mechanism for a series of multiplications and simultaneously operate the other for adding the products of said multiplication, as in billing; or, to add a column of items to two different totals, or subtract same from the totals; or, to add a column of items to one total and simultaneously subtract same from another total.

In order to adjust the machine for the various combinations two adjusting knobs 165, 166 are provided. (See Figs. 7, 30 and 31.) These knobs are mounted on a bracket 167 on the left side plate of the machine and they coöperate with dials 168, 169, respectively, and the totalizing mechanisms are denoted as "T 1" and "T 2." The knobs 165 and 166 are rotated to set the pointers thereon for the desired operation. These knobs are mounted on shafts 170 and 171, respectively. These shafts are rotatably mounted in the bracket 167. On the rear end of the shafts 170 and 171 are eccentric disks 172 which are arranged to engage pins 173 on shafts 174 and 175. These shafts are slidingly mounted in the side frames of the machine. The rotary movement of the knobs 165 and 166 causes said shafts 174 and 175 to slide laterally. Loosely mounted on said shafts and arranged in pairs are pinions 176 and 177, respectively, (see Fig. 19) which are arranged to be moved laterally with said shafts. Gear wheels 178 are loosely mounted on a shaft 179 which is fastened in the side plates. These gear wheels 178 are of two thicknesses and are arranged in pairs on said shaft 179. A thin gear and the tnick gear adjoining the same to the right form one pair or set.

The item wheels 12 are arranged to be moved into mesh with these gears 178 and in such a manner that an item wheel will engage the two gears forming one set, which are thereby revolved as a unit. The pinions 176 and 177 are normally in mesh with the broad gear 178 of the respective pairs or sets and are arranged to slide in mesh with the narrow gears.

Two series of totalizing wheels 180 and 181 are loosely mounted on shafts 182 and 183, (see Figs. 3 and 19) and are slightly laterally displaced with relation to each other, so they can engage gear wheels 184 and 185 which are loosely mounted on shaft 186. In mesh with these gear wheels 184 and 185 are gear wheels 187 and 188. The pinions 176 are arranged to slide into mesh with said gear wheels 187 and 188 and the pinions 177 are arranged to slide in engagement with the gears 184 and 185 according to the desired connection. The gear wheels 187 and 188 are arranged to rotate the totalizing wheels 180 and 181 in direction for subtraction. An adjustment of the upper knob 165 to set the pointer to "T 2," will cause the pinions 176 to move laterally to such a position that each one of a pair of said pinions 176 will mesh with one of a pair of gears 187 and will also mesh with a pair of gear wheels 178 which are arranged to be moved as a unit by an item wheel; this position is shown on Fig. 19. The disengagement of an item wheel from a pair of gears 178 will leave said gears with their respective gear trains, as two separate trains, thereby leaving either one free to be moved by its respective carrying mechanism.

In Fig. 49 is shown the upper totalizing mechanism or "T 1" connected for addition. In Fig. 50 is shown the lower totalizing mechanism or "T 2" connected for subtraction. In these views the pitch circles of the several gears are shown in scheme.

*Visible total.*—For the operation of division it is necessary to see the dividend to determine when the divisor must be moved to a different order. It is further desirable to obtain the results of the various operations from the calculating machine proper and not depend upon a printing attachment to obtain same; therefore, two sets of visible total disks 189 and 190 are rotatably mounted on shafts 191 and 192 and are in gear connection with the total wheels. The respective total disks have pinions 193 and 194 which mesh with gears 195 which are arranged in pairs and rotatably mounted on a shaft 196, and these gears are in mesh with gears 187 and 188, thereby establishing gear connection with the totalizing wheels.

*Totalizing mechanism locking devices.*—The totalizing wheels 180 and 181 are positively locked against rotation by lock-pawls 197 having a bent end portion adapted to enter between the teeth of said wheels. (See Figs. 21, 22 and 26.) The pawls 197 are pivotally mounted on a shaft 198 and the downwardly extending arm 199 has a partly inclined slot 200. Levers 201 are pivotally mounted on said shaft 198 adjoining the pawls 197. Said levers have downwardly extending and offset portions 202 having a straight slot 203 in alinement with the straight part of slot 200 in lock pawl 197. Levers 204 are mounted between the pawl 197 and the offset portion of lever 201 and have pins 205 which enter the slots 200 and 203 of pawls 197 and of levers 201, thereby being suspended on said pins 205. An upward movement of levers 204 causes a relative movement of pawls 197 and levers 201, and as levers 201 are firmly held in position during this upward movement of levers 204, the lock-pawls 197 are disengaged from the totalizing wheels. The levers 204 are held in normal or lower position by springs 206. In order to cause only such of the totalizing wheels to be unlocked as are brought into gear connection with the item wheels, certain selecting devices are provided. A dial 207 (see Fig. 7) is mounted on left side of machine below the aforesaid adjusting dials 168 and 169 and a knob 208 operates a shaft 209 in a similar manner as the knobs 165 and 166. On said shaft 209 are pivotally mounted levers 210 which are arranged to be moved laterally with said shaft 209. The rearward extensions of these levers 210 are arranged to enter recesses 211 in the aforesaid suspended levers 204 (see Fig. 20) and the forwardly extending part 212 has a recess arranged to be engaged by a rod 213 affixed to the item wheel carriage. A rotatory movement of the knob 208 will move said levers 210 laterally so that they may engage such of the levers 204 as operate the locking pawls 197 of either one of the totalizing mechanisms, or such levers as operate the lock pawls of both totalizing mechanisms. These parts are arranged so that the lateral travel of the item wheel carriage to engage a number of totalizing wheels will cause the rod to enter the recesses of such of the levers 210 as are in engagement with a number of suspended levers 204 equal in number to the number of totalizing wheels connected with the item wheels. The engaging movement of the item wheel carriage will cause such of the levers 210 as are engaged by rod 213 to be oscillated, thereby, raising the respective suspended levers 204 and unlocking the lock pawls 197 from the respective totalizing wheels.

*Carrying mechanism.*—Each of the said totalizing mechanisms has a carrying mechanism which can be adjusted for either addition or subtraction.

*Adjusting.*—Two knobs 214 are provided on the left side plate of the machine to adjust the carrying mechanisms to perform the desired operation. (See Fig. 30.) Briefly stated, the operation of a knob moves one or the other of two sets of cams in effective position, by slightly rotating said cams and then moving same laterally; or, reversed, first moving same laterally and then rotating same. Said cams are arranged in alternate sets. The cams 215 and 216 form one set and the cams 217 and 218 the other set and both sets of cams are rigidly mounted on the rotatably and laterally movable sleeve 219. (See Figs. 23, 28 and 29.) The sleeve 219 is journaled in the left side plate and through said sleeve extends a shaft 220 which is journaled in the right side plate. A part of said sleeve 219 extends through the left side plate and has affixed to it a grooved disk 221 and a disk 222. The disk 222 carries on its periphery a pin 223 and a projection 224 having a downwardly extending part 225. The shaft 220 extending through said sleeve 219 carries on its end a collar 226 having two holes 227 therein. The knob 214 carries a curved shield 228 having a notch 229 and is rotatably and slidingly mounted on said shaft 220. It also has a pin 230 arranged to engage one or the other of the two holes 227 in the end collar 226 and a spring 231 is arranged to force the knob against the end collar thereby locking said knob in one or the other of its positions and thereby locking said sleeve and said shaft together. A disk 232 is rigidly mounted on said shaft 220 between the knob and the aforesaid disk 222. The disk 232 has a recess 233 and a pin 234, said recess being arranged to be engaged by the bent portion 225 of projection 224 on disk 222.

Assuming the parts to be in the position as shown in Fig. 23 and it is desired to set said parts to the other position, as shown in Fig. 28: A movement of knob 214 against spring 231 to disengage pin 230 from hole 227 and then a rotatory movement of the knob 214 will cause disk 222 and sleeve 219 with cams thereon to be rotated. The pin 223 on disk 222 engages the notch 229 in the shield 228 and cannot disengage therefrom because sleeve 219 cannot at this time move laterally, as the downwardly extending part 225 of the projection 224 on disk 222 slides along the face of the disk 232 fastened to shaft 220. The cams and the sleeve 219 and the disk 222 will be rotated until the projection 225 strikes the limit pin 234 on the disk 232 and the projection 225 is in position to engage the recess 233 in the disk 232. A further rotation of the knob 214 will cause the inclined surface of the notch 229 in the shield 228 to force the pin 223 to disengage, thereby moving the disk 222 and the sleeve 219 with the cams thereon laterally. A shoulder 235 on said shield limits the movement of the knob 214 and a lateral movement thereof causes its pins 230 to engage a hole 227, thereby locking the knob in this position. A resetting to the former position is of course the exact reverse from the above.

*The carrying mechanism.*—As mentioned above, the initial stroke of the item lever clears the item mechanism and transfers proportional movement to the totalizing mechanism, thereby unlocking and relocking same, and setting the necessary carrying trains in position to carry. During the return stroke of the item lever, the carrying trains are actuated to carry, and such parts as had been set out of normal position will be reset to normal position. For the sake of clearness, we may, therefore, subdivide the carrying mechanism into four mechanisms, viz.: a setting mechanism; a wheel-locking mechanism; an actuating mechanism; and, a re-setting mechanism.

A totalizing wheel and its three cams together with the set lever 240 and the lock pawl 197 form a setting mechanism positively locked in normal and in set position and positive in its functions. The lockpawl 197, the release lever 201, the connecting rod 204, and the lock finger 251 form a wheel-locking mechanism positively locked and positive in its function to release and relock. The carrying finger 253, the actuating levers 269 and the respective actuating cams 215, 216, 217, 218 form an actuating mechanism, positively locked in all positions and positive in its functions.

The resetting mechanism is arranged to actuate all carrying trains of a totalizing mechanism simultaneously and the crossbar 253 mounted in the oscillating frame plates 254 which is actuated by cams 257 form the resetting mechanism and it is positively locked and positive in its function. The various parts are so combined that the parts of one mechanism are the locking or actuating means of parts of another mechanism. The word "positive" as employed here shall signify that no spring or resilient element is used to transmit or produce movement or to resist or lock against movement.

*Setting mechanism.*—Rigidly mounted on each totalizing wheel are the cam disks 236, 237 and 238. (See Figs. 23, 24 and 40). The cam disk 236 has two diametrically positioned cams 239, each extending through the arc of one unit movement and which engage the forward arm of the set lever 240. The set lever 240 is pivotally mounted on the shaft 241 and the rear arm carries a lock pin 246 which locks the lever by engaging lock lever 243. The lock lever 243 is pivotally mounted on a shaft 244 and is laterally movable therewith to thereby engage either cam disk 237 or cam disk 238. The cam 237 being used during operation for addition and cam 238 for subtraction. The shaft 244 is moved laterally by a lever 245 which is pivotally mounted on the left side plate of the machine and one end pivotally connected to shaft 244 and the other end having a pin 246 which engages the groove in disk 221 on sleeve 219 which sleeve is moved laterally by the adjusting knob 214. The cam disks 237 and 238 have recesses 247 and 248, respectively, which are arranged to engage the forward arm of lock lever 243 and each recess extending through the arc of one unit movement. These parts are so arranged that a rotary movement of the totalizing wheels from "9" to "0" or "0" to "9", according to the operation of the machine, will cause the lock lever 243 to disengage the pin 242 on the set lever 240 and move said set lever 240 to a set or effective position and then reengage the pin 242 on the set lever 240 on the other side of same, thereby positively locking said set lever in set or effective position.

The cam disks 237 and 238 are arranged to have the deepest point of the recess 247 and 248 at one-quarter of a unit movement from the starting point, so that when a cam projection 239 on cam disk 236 has actuated the set lever 240 one half of the total actuation, and the lock pin 242 on the set lever 240 has traveled one-half of the total travel, then the cam surface of a recess 247 or 248 will commence to relock the set lever 240 in set or effective position by forcing the forward arm of lock lever 243 out and reëngaging the rear arm with the lock pin 242 and then completing the relocking actuation during the unit movement of the totalizing wheel.

*Wheel locking mechanism.*—As above stated, the respective lock pawls 197 and their release levers 201 are connected by a slot and pin connection to each other and to the respective levers 204. When the pin 205 is in normal position the lock pawl and its release lever move as a unit. The upper arm of the release lever 201 (see Fig. 27) is slotted and this slot 249 is arranged to be engaged by a pin 250 in lock finger 251 and by a pin 252 on carrying finger 253. These pins 250 and 252 are located in a vertical plane. The walls of said slot 249 are shaped to provide cam surfaces for purposes hereinafter set forth. The function of the lock finger pin 250 is to lock the release lever 201 in normal position irrespective of whether the carrying train is in normal or set position; and, further, to release the lever during actuating movement and to relock the same in the final portion of an effective actuation by engaging and forcing the release lever to oscillate to normal position. The function of the carrying finger pin 252 is, first, in case the carrying train is in set or effective position, an actuation of said carrying finger releases the totalizing wheel by forcing the release lever to oscillate and carry with it the lock-pawl; and second, if the carrying train is in ineffective position, an actuation of said finger holds the lock pawl in locked position during the actuation movement.

*Actuating mechanism.*—As above stated, the item lever 77 through the sector 88 rotates the shaft 87 and the main spring 91 retracts said lever to normal position. Mounted on said shaft 87 is a sector 254 which engages a rack bar 255 which is slidingly mounted in groove 256 cut in an elongated projection 257 on the right side plate. Two pins 258 are mounted in sides of said rack bar and travel in slots cut in the said projection 257 to guide the rack during movement. Gears 259 are rotatably mounted on shafts 220 and are in mesh with rack 255. Affixed to each gear 259 is a pawl disk 260 carrying a pawl 261 arranged to engage a notch in disk 262 rigidly mounted on said shaft 220. Limit pawls 263 (see Fig. 46) are pivotally mounted on the right side plate of the machine and pins 264 on the rack bar 255 engage the said pawls. These pawls are arranged to engage a notch 265 in disk 262 and a spring 266 is arranged to disengage the pawl from the disk whenever the rack 255 is actuated. These parts are so arranged that the initial stroke of an item lever operation rotates the gears 259 one revolution in one direction, the pawl 261 thereby riding on the periphery of the disk 262 until it reëngages its notch 267, and the return stroke of the item lever rotates the pawl disk in the reverse direction, the pawl thereby rotating the disk 262 and shaft 220. In the final portion of this movement the pin 264 on the rack bar engages the limit pawl 263 and forces it into engagement with the notch 265 in the disk 262, thereby locking same. The sleeve 219 carrying the actuating cams is firmly connected to the shaft 220 by the adjusting mechanism described heretofore, and is therefore rotated one revolution by an operation of the item lever. The schematic views, Figs. 49 and 50 show the direction in which the totalizing wheels are moved for addition and subtraction, and a carrying movement must of course rotate the totalizing wheels in the same direction for the respective operation. The carrying finger 253 which is arranged to engage the teeth of the totalizing wheels 180 and 181 is therefore arranged to assume two normal positions, one for addition and one for subtraction; and the extreme actuated position for one operation is the normal position for the reversed operation. The pin 252 on carrying finger 253 engages a curved slot 268 in the downward extension of set lever 240 which is operatively connected to the totalizing wheel of next lower order and the carrying finger upon being actuated necessarily describes a curved path. These parts are so arranged that when the set lever 240 is in normal position and the carrying finger is actuated, it will not engage a tooth of the totalizing wheel, but when said set lever has been set in set or effective position, the carrying finger upon being actuated will engage a tooth of the totalizing wheel and irrespective of the direction in which it is operated.

The carrying finger 253 is pivotally mounted on the actuating lever 269 which has two projections 270 and 271 to engage the actuating cams. The actuating revolution of the cams may be divided into ten unit angular movements of 36 degrees each and we may assume to have eight carrying trains to be actuated in succession, and each during an unit angular movement of 36 degrees. The actuating cams are arranged to actuate the levers 265 in succession in one direction and simultaneously in the other direction. Assume 36 degrees angular movement for resetting the set levers 240 to normal position while the carrying trains are held in actuated position and the remaining 36 degrees angular movement for returning the levers 269 and the restoring device to normal position. It will, therefore, be understood that the cams actuating the arms of the actuating lever 269 are timed to be functionally effective in succession from right to left, the next cam to the left always being 36 degrees later to actuate, or when the cam to the right has completed actuation. Fig. 21 shows a carrying train adjusted for subtraction and if it is desired to adjust same for addition, the adjusting knob 214 is actuated to rotate the actuating cams one unit movement in the reverse direction to the actuating direction, thereby raising all the levers 269 and bringing the carrying finger 253 in upper or adding position; then the lateral movement of the actuating cams caused by the further actuation of the knob 214 causes the actuating cams 215 and 216 to disengage from the actuating lever 269 and causes cams 217 and 218 to be moved into engagement therewith; the cams 217 and 218 being arranged to actuate the levers 269 in succession from right to left, in the same manner as cams 215 and 216, the difference being that the starting point or normal position of the carrying finger has been reversed, to thereby reverse a carrying movement of the totalizing wheel.

*Resetting mechanism.* The resetting mechanism, to reset such of the set levers as are in effective position after carrying actuation to normal position, is arranged to be functionally effective when all the carrying fingers of a carrying mechanism are in extreme actuated position. This is arranged so that the carrying fingers, guided by the curved slots in said set levers, do not reëngage the total wheels during the return movement to normal position. A cross rod 272 is mounted in frame plates 273 and 274 which are rigidly mounted on the shaft 275 journaled in side plates of the machine. (See Fig. 25). An oscillation of the frame plates causes the rod 272 to engage the rear extension of such set levers 240 as are in effective position and move same to normal position. The shaft 244 on which the lock levers 243 are mounted is journaled in elongated slots in side plates and is held in upper or normal position by the concentric lock surfaces 276 of the frame plates 273 and 274. An oscillation of these frame plates 273 and 274 will disengage the concentric surfaces 276 from said shaft 244 which thereby becomes free to move in the elongated slots a distance sufficient to disengage the rear extension of the lock levers 243 from the lock pins 242 on the set levers 240 thereby leaving the same free to be moved to normal position by said rod 272. The return movement of the frame plates 273 and 274 will cause the inclined surfaces 277 to engage the shaft 255 and force the same back to its normal position thereby relocking the set levers in normal position. The right frame plate 274 has two arms which are arranged to be engaged by cams 278 and these cams are timed to be functionally effective after the eight carrying trains have been actuated and during the ninth angular movement. During the tenth unit angular movement the carrying fingers are moved to normal position.

*Operation of carrying train.*—A movement of a totalizing wheel from "9" to "0" or from "0" to "9" causes the set lever 240 to be set in effective position and carry with it the carrying finger 253. The pin 252 on said finger thereby moving forward in the slot 249 of the release lever 201, thereby unlocking the same. The release lever continues to be locked by reason of the pin 250 on the lock finger 251 engaging the rear surface of the lower part of said slot 249. This is the position assumed by the parts when the carrying train is set in effective position. An actuation of the train causes the lock finger 251 to be moved, the pin 250 thereby releasing the release lever 201. Simultaneously with this action 252 on the carrying finger 253 following the curved slot 268 in the set lever 240 engages the forward surfaces of the upper part of the slot 249 thereby forcing the release lever 201 to oscillate, and through the same the lock-pawl 197 to unlock the totalizing wheel to be carried. During the completion of the actuation, the carrying finger guided by the curved slot in the set lever, engages and rotates the totalizing wheel. During the final portion of the actuating movement the pin 250 on the lock finger 251 reëngages the rear surface of the lower portion of the slot 249 and forces the release lever back to normal position, thereby relocking the totalizing wheel. Simultaneously with this action the carrying finger pin 252 releases the release lever, so it is free to be moved to normal position. After this actuating movement, the resetting mechanism is actuated. The set lever is set to normal position and the carrying finger is moved back, the pin 252 thereby traveling in the slot 249. The normal setting of the carrying train causes the pin 252 of the carrying finger 253 to move along the rear surface of the upper part of the slot 249, thereby holding the release ever 201 in locked position.

*Clearing mechanism.*—Two clearing knobs 279 and 280 are provided on the right side of the machine. An operation of these knobs connects the clearing mechanism with the totalizing mechanisms in such a manner that an item lever operation will clear the totalizing mechanisms.

Two series of 10 tooth pinions 281 are rigidly mounted on shafts 282, respectively, (see Figs. 3, 43 and 44) and in proper meshing distance with the totalizing wheels, and arranged to engage and rotate the totalizing wheels to normal position. Two teeth 283 on each totalizing wheel are reduced in width and a tooth on a pinion 281 is removed, thereby forming a space 284. Either of said teeth 283 and the space 284 on the respective pinion are arranged to fall on a line drawn from the center of the totalizing wheel to the center of the pinion when said total wheel and said pinion are in normal position. By this arrangement, either the totalizing wheel or the pinion can rotate while the other is in normal position. When said totalizing wheels are set in position to represent a total, then a rotation of the clearance pinions 281 in the clearing or subtracting direction, will cause the same to engage and rotate the totalizing wheels, until a tooth 283 on the totalizing wheel prevents further rotation, the totalizing wheel then being in normal position. The pinions 281 rotate until they have completed a revolution and will then rotate back to normal position.

A gear 285 (see Figs. 36 and 37) is slidingly keyed to a shaft 282 on which the clearance pinions 281 for the upper totalizing mechanism, or "T 1" are mounted. Said gear is arranged to be slidingly operated by the knob 279, to thereby engage the gear 285 with the rack bar 255 which in turn is operated by the item lever. A pin 286 on said gear 285 is arranged to engage a hole 287 in the side plate of the machine to thereby normally lock the clearance pinions 281. A gear 288 is rigidly mounted on the shaft 281 on which the clearance pinions 281 for the lower totalizing mechanism or "T 2" are mounted. Two integral gears 289 and 290 are rotatably and slidingly mounted on the shaft 183 and are operated by the knob 280 to engage the gear 290 with the rack bar 255; the gear 289 remaining in mesh with the gear 288. A pin 291 on the gear 289 is arranged to engage a hole 292 in the side plate of the machine to thereby normally lock the clearance pinions. An unlocking mechanism is provided to unlock the lock-pawls from the totalizing wheels so that they can be rotated for clearing movement. The said shafts 282 extending through the left side plate of the machine carry notched disks 293 rigidly mounted thereon. (See Fig. 30.) Disks 294 carrying pawls 295 are rotatably mounted on said shafts 282 and said pawls 295 are arranged to engage the notched disks 293. A bar 296 is slidingly mounted on the left side plate and the extensions 297 are arranged to engage cam recesses 298 on said disks 294. These parts are so arranged that a revolution of shafts 282 will rotate disks 294 in one direction, thereby actuating the bar 296. The lower part of said bar 296 is operatively connected to a lever 299 which is rigidly mounted on a shaft 300. The shaft 300 is journaled in the side plates and two arms 301 (see Figs. 3 and 6) are mounted thereon and are connected on their upper portion by a rod 302. This rod 302 is arranged to engage slots 303 in the upward extensions 304 of levers 210. These levers 210 actuate the lock-pawls of the totalizing wheels and are set by the knob 208 as described above. These parts are so arranged that to clear one or both of the totalizing mechanisms, the knobs 279 and 280 and 208 are set correspondingly and then the item lever is operated. This causes one revolution of the shafts 282 in one direction and then in the opposite direction. The initial portion of the initial revolution of the shafts causes the levers 210 to be oscillated, thereby unlocking the totalizing wheels. The final portion of the initial revolution will cause the re-locking of the totalizing wheels.

*Printing mechanism connection.* — The printing mechanism is arranged to be connected to print the items entered into one or the other of the totalizing mechanisms and to print the totals of one or the other. The knob 305 on the right side of the machine is laterally movable, to slide a shaft 306 on which a series of pinions 307 are loosely mounted, laterally, to thereby establish gear connection between a gear 308 and a gear 309 or a gear 310. The gears 309 and 310 are rotatably mounted on a shaft 311. The gear 309 is in mesh with gear 187 which is in gear connection with the totalizing mechanism "T 1" and the gear 310 is in mesh with gear 188 which is in gear connection with the totalizing mechanism "T 2". The pinion 307 is always in mesh with the gear 308 which in turn is in mesh with a pinion 312, which meshes with a gear 313. The gear 313 is the middle gear of a set of three gears which actuate the type-bars 314, the other gears being gears 315, 316. Said knob 305 has a pointer to indicate on an indicator plate the position to which the knob must be set. The type bars 314 carry each one set of type from "0" to "9" inclusive and are actuated in the same direction for addition and subtraction, and as the totalizing wheels and the gear wheels in mesh therewith are reversed for subtraction, gearing is provided, to transform such reverse movement to movement in the proper direction to actuate the type bars.

The type bars 314 are slidingly mounted on shafts 318 and 319 and the front and rear ends are bent. A metal strip 320 (see Figs. 34 and 35) carrying embossed type 321 is fastened to the front end of the type bar and is fastened in the rear of a deflecting spring 322 which is mounted on the type-bar 314. By this arrangement the type strip 321 can be raised at any point, sufficient to print and the spring 322 also compensates for any stretching of the type strip. The lower front edge of the type-bar has gear teeth 323, thereby forming a rack and another rack 324 is arranged, by cutting gear teeth in the upper front edge of the type-bar and bending the same over, to form a U with a short and a long leg. The lower rack 323 is arranged to mesh with a gear 315 of the aforesaid set of three gears. The upper rack 324 is in mesh with a pinion 325 which is rotatably mounted on the shaft 318 and engages gear 316 of the aforesaid set of three gears. The arrangement is such that a movement of gear 315 in one direction transmits proportionate movement to the type bar and that a movement of gear 316 in the reverse direction to the movement of gears 315 also transmits proportionate movement to the type-bar. A series of pinions 326 are rotatably mounted on a shaft 327 which shaft is slidingly mounted in oscillating frame plates 328 mounted within the side plates of the machine. A knob 329 on the left side of the machine is operated to slide said shaft 327 laterally to thereby bring said pinions in a position where an oscillation of the frame plates 328 will cause said pinions 326 to engage either gears 313 and gears 315 or gears 313 and gears 316. In normal position these pinions are held against rotation by engaging a lock plate 330. Said pawl 329 has a pointer to indicate on an indicator plate 331 the position to which the knob must be set.

The schematic view, Fig. 49, shows the upper totalizing mechanism or "T 1", adjusted for addition and the printing mechanism is shown connected as during movement. The pitch circles and pitch lines of the gears and racks which are in operative connection during this movement are drawn out in solid lines, and the arrows indicate the direction of rotation.

The schematic view, Fig. 50, shows the lower totalizing mechanism or "T 2", adjusted for subtraction and the printing mechanism is shown connected as during movement. The pitch circles and pitch lines of the gears and racks which are in operative connection during this movement, are drawn in solid lines and the arrows indicate the direction of rotation.

Whenever the printing mechanism is connected to print items then the frame plates 328 oscillate in synchronism with the item wheel carriage, to simultaneously connect the item wheels with the totalizing mechanism, and the printing mechanism with the totalizing mechanism during the period of delivery of the item. A lever 332 (see Fig. 30) is pivotally mounted on the left side plate and the lower extension 333 is slotted to engage and guide a pin 334 on a connecting lever 335 which is pivotally mounted on a sliding bar 336. A lever 337 is rigidly mounted on the shaft 338 to which the oscillating frame plates 338 are fastened and the front end 339 is slotted to receive a pin 340 on said connecting lever 335. The sliding bar 336 is slidingly mounted on the side plate and the lower end 341 is pivoted to an oscillating lever 342 which is pivotally mounted on the side plate and is itself oscillated by the rear extension 343 of the oscillating frame arm 6 (see Fig. 6) on which the item wheel carriage 7 is mounted.

The parts are so arranged that an operation of the lever 332 to connect the printing mechanism, causes the pin 340 on lever 335 to enter the slot on lever 337 and in this position an engaging movement of the item wheel carriage will cause an engaging movement of the pinions 326.

*Release and zero setting of type-bars.*—Pivotally mounted on the right side plate of the machine is a sector 344 which meshes with a rack bar 255. A slot 345 on said sector 344 is arranged to engage a pin 346 extending through a slot 347 in side plate and mounted on a lock frame 348 which is pivotally mounted between the side plates of the machine. A cross plate 349 is mounted on the upper ends of the side plates of the lock frame 348 and is adapted to engage the rear ends of the type bars 314 which are cut out to form a projection. In normal position, the lock frame locks all type-bars in normal position and an actuation of the item lever causes the lock frame 348 to swing forward, thereby leaving all type-bars 314 free to be moved forward by their respective gearing. The return stroke of the item lever causes the lock frame to swing back, thereby moving all type-bars to normal position.

*Hammer mechanism.*—A series of printing hammers 350 are pivotally mounted on a shaft 351 and are arranged to strike a series of hammer blocks 352 slidingly mounted in a casing 353 and arranged to be moved to lift the type-strip 320 against the platen 354 to thereby print. A series of levers 355 are pivotally mounted on the shaft 351 and adjoining hammers 350 and have a slot 356 arranged to engage a pin 357 on the hammers 355. To the lower extensions of these levers 355 springs 358 are fastened, the other ends of these springs are fastened to a shaft 359 mounted in the lock frame 348. The hammers 350 have a lock projection 360 and a lock pawl 361 is arranged to normally engage the same. A cross plate 382 is mounted in the side plates of the lock frame 348 and is arranged to release said lock-pawls 361 from said hammers. These parts are so arranged that the forward oscillation of the lock frame 348 brings all hammer springs 358 at tension and the final portion of the forward oscillation releases the hammer lock pawls 361 by cross plate 362 striking and releasing the same. The levers 355 are arranged to be stopped by a shaft 363 but the hammers 350 can continue a short distance further by reason of the slot and pin connection with said levers. The return oscillation of the lock frame will cause the cross plate 362 to engage the levers 355 and move same to normal position and through the same the hammers 350, the lock pawls 361 thereby re-engaging the projection 360.

*Zero printing.*—The type bars 314 are normally in such a position that a hammer block 352 stands under the type "0" and mechanism is provided to avoid the printing of any "0" to the left of any other digit in an item. The upper edge of each type bar slot 364 has a cam recess 365 and the pins 366 on levers 367 which are pivotally mounted on a shaft 368 are arranged to normally engage the recesses 365. Levers 369 are pivotally mounted on a shaft 370 and the downwardly extending arms 371 engage the lock projections 360 on the hammers 350, thereby preventing printing movement of said hammers. The upper arms 372 of these levers 369 carry pins 373 protruding on both sides of the levers. The back half of the part of a pin protruding on the left side of a lever is cut away and the front half of the part of the pin protruding on the right side of a lever is cut away. The pins 373 are mounted in alinement and the length of the pins is such that the part of a pin protruding to the right of a lever 369 engages the part of a pin protruding to the left of the lever adjoining the said lever to the right. The front edge of a lever 367 forms a cam surface which engages the pin 373 on a lever 369. These parts are so arranged that the movement of a type-bar causes its lever 367 to be actuated, which in turn moves the respective lever 369 and through the pins 373 all of the levers 369 to the right of the lever 369 primarily actuated, thereby unlocking the respective hammers 350.

*Secondary item indicator.*—Secondary item wheels 374 (see Figs. 3, 7 and 32) are rotatably mounted on a shaft 375 in swing frame 376, which is mounted between the side plates of the machine. Said frame is arranged to oscillate in synchronism with the item wheel carriage, whenever connected. The wheels are arranged to engage the gears 178 and carry the visible figures "0" to "9" inclusive, and each wheel has a spring 377 tending to hold the same in normal position. Each wheel 374 has a pin 378 arranged to engage a zero plate 379 mounted in said swing frame 376 to thereby hold the wheel in normal position.

Rigidly mounted on a shaft 380 is a lever 381 which has a pin 382 which engages a slot 383 on a lever 384. This lever 384 is pivotally mounted on the side plate of the machine and the lower extension 385 has a pin 386 arranged to be engaged by a slot in a lever 387 but normally out of engagement therewith. The lever 387 is rigidly mounted on a shaft 388 which is rotatably and slidingly mounted in a bracket 29 and the side plate of the machine and is operated to slide the slot therein into engagement with the pin 386 on the lever 385. A recess on the lever 387 is permanently in engagement with the rod 213 of the item wheel carriage and an engaging movement of said carriage will oscillate said lever 387 and through the same the lever 384 and swing frame 376, thereby moving said secondary item wheels into engagement with the gears 178. A retaining plate 389 is fastened to a sleeve 390 which is mounted on the shaft 380 and the front edge is bent to engage the teeth on the gears 374 to thereby hold the same in the position to which they may be rotated. A rearwardly extending arm 391 is rigidly fastened to said sleeve 390 and two pins 392 and 393 extend through slots 394 in the side plate. A spring 395 is connected to the pin 392 and tends to hold the retaining plate 389 in engagement with the wheels 374 during the oscillating movement of the same. A lever 396 is pivotally mounted on the side plate of the machine and the upper arm of same has an inclined and a concentric surface 397 arranged to engage the pin 393 on a lever 391 to thereby disengage the retaining plate 389 from the wheels and hold the same out of engagement. The lever 396 is actuated by the digit keys to thereby clear the secondary item mechanism, before entering a new item into the same. The lever 384 has an arm 398 arranged to engage and move the lever 396 to thereby disengage the same from the pin 393. This actuation occurs whenever the frame 376 is oscillated, to thereby cause the retaining plate 389 to reëngage the secondary item gears. The digit keys actuate the secondary item mechanism by the following means. The shaft 43 actuated by the key bars 48 for the purpose of actuating the item wheel carriage escapement, as described above, has a lever arm 399 rigidly secured thereto. A lever 400 is rigidly mounted on a shaft 401 journaled in brackets 402 and in the right side plate and a connecting rod 403 connects the lever 400 with the aforesaid lever arm 399. The left end of said shaft 401 has a lever arm 404 rigidly mounted thereon and the rod 405 operatively connects this lever arm 404 with the lever 396 which actuates the retaining plate. These parts are arranged to operate as follows: An actuation of any one of the digit keys disengages the retaining plate 389 and holds it in disengaged position, thereby leaving the secondary item wheels 374 free to be moved to normal position by their springs 377. Parts remain in this position until an actuation of the item lever immediately causes the secondary item wheels to be moved into engagement with gears 178 and simultaneously causes the retaining plate 389 to reëngage the secondary wheels. The delivery of an item into the totalizing mechanism will then cause the secondary item wheels to be rotated in proportion to thereby visibly show the item through an opening in the casing, the retaining plate riding over the teeth of the secondary item wheels during this movement of the same. The disengaging movement of the item wheel carriage causes disengaging movement of the secondary item wheels, and during this disengaging movement the wheels are held in position by the retaining plate 389 thereby retaining the item until a key operation causes the secondary item wheels to be cleared.

*Shock guard and speed regulator.*—The item lever consists of two members $77^a$ and $77^b$, (see Figs. 1, 2, 6, 38 and 39) the front member $77^a$ is arranged to be manually operated, and is rotatably mounted on a shaft 406 which is journaled in brackets 90. Rigidly mounted on this shaft is the rear member $77^b$ which has a concentric recess cut in to form a spring casing. A spring 407 is mounted in said spring casing and one end is fastened to the shaft 406 and the other end is fastened to a pin 407 mounted in the adjoining front lever $77^a$. A pin 408 is mounted on the rear lever $77^b$ and engages a slot 409 in the front lever $77^a$. These parts are so arranged that the tension of the spring normally holds the pin 408 against one end of the slot 409 and an actuation of the front lever $77^a$ causes an actuation of the rear lever $77^b$ through said spring 407, the two levers thereby moving as a unit. In case the work to be performed by the rear lever $77^b$ is increased, or, if the front lever $77^a$ be actuated more rapidly than the spring is adjusted to be actuated, then the rear lever $77^b$ will lag behind and the spring 407 will partly close and the pin 408 will travel in the slot 409. By this arrangement, shocks and forced movement of the rear lever $77^b$ and parts connected to the same are avoided. To the rear lever $77^b$ a speed regulator is connected, which speed regulator has the function to limit the velocity with which the item lever shall be moved in either direction.

Two cylinders 410 and 411 are bored in the casting 412 which is oscillatingly mounted on the base plate and two ports 413 connect said cylinders. A piston 414 is connected to the lever 77ᵇ and reciprocates in the cylinder 410. A valve plate 415 is rigidly mounted on a shaft 416 which is slidingly mounted in the cylinder 411. Two tapering valve seats 417 are arranged in the cylinder 411 and the valve plate 415 is held in middle or open position by two springs 418.

An operation of the lever 77ᵇ causes the piston 414 to be moved thereby causing a liquid in said cylinders 410 and 411 to circulate, and when the lever is operated with normal velocity, then no resistance is offered to the flow of the liquid; but when said lever 77ᵇ is operated with extraordinary velocity, then the flow of the liquid will cause said valve plate to be moved toward the seat, thereby throttling the flow of the liquid which then reacts on the piston and the lever.

The return stroke of the item lever is accomplished by means of the main spring 91 which is adjusted to return the lever under a maximum load. A reduction of the load or work to be performed by lever 77ᵇ will cause the spring 91 to actuate more rapidly; but an increased velocity of lever 77ᵇ will cause the liquid in the cylinders 410 and 411 to circulate more rapidly, thereby causing an increase of pressure against the valve plate 415 and causing the same to be moved toward its seat 417. This movement of the valve plate throttles the flow of the liquid, because it reduces the cross section of the valve opening. A restriction of the flow of the liquid reacts on the piston and through the same on the lever 77ᵇ and represents an addition of load for the spring, sufficient to counterbalance the previous reduction. When the front lever 77ᵃ is operated quicker than normal, then the spring 407 will partly close, thereby exerting more force on the rear lever 77ᵇ and therefore tending to cause same to follow and move quicker than normal, but this increased velocity is immediately checked by the valve plate restricting the flow of the liquid and counterbalancing the increase of force on the lever and forcing same to maintain a normal velocity. These parts are so arranged that the valve plate 415 will automatically attain a position where it counterbalances any force tending to increase the normal velocity of the movement of the lever in either direction.

*Paper and ribbon feed.*—The platen 354 is revolubly mounted in the side plate of the machine and a paper feeding device and an inking ribbon device are provided. The shaft 419 in which the platen 354 is mounted has a ratchet 420 affixed thereto which is arranged to be engaged by a pawl 421 which is mounted on a plate 422 slidingly mounted on the right side plate of the machine. Said plate 422 is held in normal or lower position by a spring 423 and is arranged to be actuated by a pin 424 fixed to the rack bar 255.

The inking ribbon 425 is mounted on revolubly mounted spools 426. A ratchet 427 is affixed to one of said spools and a feed pawl 428 is adapted to be actuated by a spring 429 to thereby feed the ribbon. A pin 430 mounted on the rack bar 255 is arranged to set said spring 429 in position to actuate said feed pawl 423. Said ribbon is arranged to be rewound in the reverse direction by the lever 431 affixed to the ribbon spool on the left side of the machine.

Obviously, my device is capable of considerable modification within the scope of my invention, and therefore I do not wish to be limited to the specific construction shown and described.

What I claim as my invention and desire to secure by Letters Patent is:

1. In a computing machine, totalizing mechanism comprising a series of total wheels, a carrying train arranged between each two adjacent total wheels and comprising a set lever arranged to be actuated to set the carrying train in position to carry when actuated, means to positively lock said lever in normal position and in set position, means operatively connected to the total wheel of lower order to unlock, to move and to relock said set lever in set position.

2. In a computing machine, totalizing mechanism comprising a series of total wheels, and a carrying train arranged between each two adjacent total wheels and comprising a set lever arranged to be actuated to set the carrying train in position to carry when actuated and arranged to be positively locked in normal and in set position, means operatively connected to the total wheel of lower order to unlock, to set and to relock said set lever, and means to unlock and move said set lever to normal position, said means being arranged to be functionally effective after the carrying movement of said train.

3. In a computing machine, totalizing mechanism comprising a series of totalizing wheels, and a carrying train arranged between each two adjacent total wheels and comprising a positively locked set lever arranged to be actuated to set the carrying train in position to carry when actuated, and means operatively connected to the total wheel of lower order to unlock, move and relock said set lever and keep it locked during carrying actuation.

4. In a computing machine, totalizing mechanism comprising a series of total wheels, and a carrying train arranged between each two adjacent total wheels, said carrying train comprising a set lever arranged to be actuated to set the carrying train in position to carry when actuated, a lock lever operatively connected to the total wheel of lower order and to said set lever to lock said set lever in normal position and in set position, and means operatively connected to the total wheel of lower order to release said set lever through said lock lever, to move and set said set lever and to relock said set lever through said lock lever.

5. In a computing machine, totalizing mechanism comprising a series of total wheels, and a carrying train arranged between each two adjacent total wheels, said carrying train comprising a set mechanism arranged to be actuated to set the carrying train in position to carry when actuated, said set mechanism being arranged to assume both a normal position and a set position, said set mechanism consisting of the total wheel of lower order and two levers, means on said total wheel to lock said levers against movement, means on said total wheel to unlock and set said set mechanism in set position and to lock the same in set position, and means to unlock said lock lever from said set lever while in set position and move said set lever to normal position.

6. In a computing machine, totalizing mechanism comprising a series of totalizing wheels, and a carrying train arranged between each two adjacent total wheels, said carrying train comprising a set mechanism comprising the total wheel of lower order, a disk permanently fixed to said total wheel and having a recess on its periphery for every tenth tooth on said total wheel, a disk permanently fixed to said total wheel and having a projection on its periphery for every tenth tooth of said total wheel, a set lever arranged to be locked by the periphery of the last mentioned disk and arranged to be actuated by the projection thereon, and a lock lever arranged to lock the set lever and arranged to be locked by the periphery of the first mentioned disk and to be released by the recess thereon.

7. In a computing machine, totalizing mechanism comprising a series of total wheels arranged to be rotated in one direction for addition and in the other direction for subtraction, and a carrying train arranged between each two adjacent total wheels and comprising a set element to set said carrying train in position to carry when actuated, means to positively lock said element in normal position and in set position, and means operatively connected to the total wheel of lower order to unlock, to set and to relock said element during rotation in either direction.

8. In a computing machine, totalizing mechanism comprising a series of total wheels arranged to be rotated in one direction for addition and in the reverse direction for subtraction, and a carrying train arranged between each two adjacent total wheels and comprising a set element to set the carrying train in position to carry when actuated, means to positively lock said element in normal position and in set position, means operatively connected to the total wheel of lower order to release, to move and relock said set element in set position during rotation in either direction, and means to unlock and move said lever to normal position, said last mentioned means being arranged to be functionally effective after the carrying movement of said train.

9. In a computing machine, totalizing mechanism comprising a series of total wheels arranged to be rotated in one direction for addition and in the reverse direction for subtraction, and a carrying train arranged between each two adjacent total wheels and comprising a set mechanism to set the carrying train in position to carry when actuated, said set mechanism consisting of the total wheel of lower order, a set lever to set said train in position to carry, a lock lever arranged to engage said total wheel and said set lever to positively lock said set lever in normal position and in set position, and means operatively connected to the total wheel of lower order and arranged to be functionally effective during rotation of same in either direction to release said set lever through said lock lever, to set said set lever, and to relock said set lever in set position.

10. In a computing machine, totalizing mechanism comprising a series of total wheels arranged to be rotated in one direction for addition and in the reverse direction for subtraction, a carrying train arranged between each two adjacent total wheels and comprising a set lever to set said carrying train in position to carry when actuated, a lock lever to lock said set lever in normal position and in set position, and means operatively connected to the total wheel of lower order to unlock, to set and to relock said set element during rotation in either direction, and means to unlock said lock lever from said set lever when in set position and to move said set lever to normal position.

11. In a computing machine, totalizing mechanism comprising a series of totalizing wheels arranged to be rotated in one direction for addition and in the reverse direction for subtraction, and a carrying train arranged between each two adjacent total wheels and comprising a set mechanism, said set mechanism comprising the total wheel of lower order, two disks permanently fixed to said total wheel and each having a recess on its periphery for every tenth tooth of said total wheel, a disk permanently fixed to said total wheel and having a projection on its periphery for every tenth tooth of said total wheel, a set lever arranged to be locked by the periphery of the last mentioned disk and arranged to be actuated by the projection thereon, and a lock lever arranged to lock said set lever and arranged to be locked by the periphery of either of the first mentioned disks and to be released by the recesses thereon, one of said disks being arranged to release the lock lever during the rotation of the total wheel in one direction, and the other being arranged to release the lock lever during rotation in the reverse direction.

12. In a computing machine, totalizing mechanism comprising a series of total wheels and a carrying train arranged between each total wheel and the adjacent total wheel of the next higher order, said carrying train comprising a carrying element arranged to be actuated to engage and carry and disengage the total wheel of higher order, and means to actuate said carrying element, said carrying element being permanently and non-yieldingly operatively connected to said actuating means.

13. In a computing machine, totalizing mechanism comprising a series of total wheels and a carrying train arranged between each two adjacent total wheels and comprising a carrying element arranged to have reciprocating movement and means to actuate said carrying element, said carrying element being arranged to engage, carry and disengage the total wheel of higher order during the carrying portion of said reciprocating movement.

14. In a computing machine, totalizing mechanism comprising a series of total wheels and a carrying train arranged between each two adjacent total wheels and comprising a carrying element arranged to have reciprocating movement and means to impart said reciprocating movement to said carrying element, said carrying element being arranged to engage, carry and disengage the total wheel of higher order during the carrying portion of said reciprocating movement, and being non-yieldingly permanently operatively connected to said last mentioned means.

15. In a computing machine, totalizing mechanism comprising a series of totalizing wheels, and a carrying train arranged between each two adjacent total wheels, said carrying train comprising a carrying element arranged to be set in effective position to engage and carry the total wheel of higher order when actuated, means operatively connected to the totalizing wheel of lower order to set said carrying element in effective position, means to positively lock said carrying element in normal position and in set position, and means to impart reciprocating movement to said carrying element, said carrying element being arranged to engage, carry and disengage the total wheel of higher order during the carrying portion of said reciprocating movement.

16. In a computing machine, totalizing mechanism comprising a series of total wheels and a carrying train arranged between each two adjacent total wheels, said carrying train comprising a carrying element arranged to have reciprocating movement to engage, carry and disengage the total wheel of higher order during the carrying portion of said reciprocal movement, and arranged to be set in effective position to carry the total wheel of higher order when actuated, means operatively connected to the total wheel of lower order to set said carrying element in effective position to carry, means to impart said reciprocating movement to said carrying element, and means to set said carrying element in ineffective position, said means being arranged to be functionally effective after the carrying stroke of said reciprocating movement.

17. In a computing machine, totalizing mechanism comprising a series of total wheels and a carrying train arranged between each two adjacent total wheels, said carrying train comprising a carrying element arranged to have reciprocating movement and arranged to be moved and set in position to engage and carry the total wheel of higher order when actuated, means to lock said carrying element against setting movement, means operatively connected to the total wheel of lower order to unlock, to set and to relock said carrying element, and means to impart reciprocating movement to said carrying element, said carrying element being arranged to engage, to carry and to disengage the total wheel of higher order during the carrying stroke of said reciprocating movement.

18. In a computing machine, totalizing mechanism comprising a series of total wheels and a carrying train arranged between each two adjacent total wheels, said carrying train comprising a carrying element arranged to be set in effective position to engage and carry the total wheel of higher order when actuated, means to positively lock said carrying element in normal and in effective position, means operatively connected to the total wheel of lower order to unlock, to set and to relock said carrying element in effective position, said carrying element being non-yieldingly permanently operatively connected to said setting means and to said actuating means and means to impart reciprocating movement to said carrying element, and means to set said carrying element in normal position arranged to have reciprocating movement and being arranged to engage, carry and to disengage the total wheel of higher order, during the carrying stroke of said reciprocating movement.

19. In a computing machine, totalizing mechanism comprising a series of total wheels, and a carrying train arranged between each two adjacent total wheels, said carrying train comprising a set lever operatively connected to the total wheel of lower order, a lock lever operatively connected to the set lever and to the total wheel of lower order to lock the set lever in normal position and in set position, a carrying element permanently operatively connected to the set lever, and means operatively connected to the total wheel of lower order to unlock, to set and to relock said set lever, said carrying element being arranged to be actuated to engage, carry and disengage during carrying movement.

20. In a computing machine, totalizing mechanism comprising a series of total wheels and a carrying train arranged between each two adjacent total wheels, said carrying train comprising a set lever operatively connected to the total wheel of lower order to be actuated thereby to set the carrying train in position to carry when actuated, a lock lever operatively connected to the total wheel of lower order and to said set lever and arranged to lock said set lever in normal position and in set position and arranged to be released by the total wheel of lower order, a carrying element non-yieldingly permanently operatively connected to said set lever and to its actuating means and arranged to have reciprocating movement and arranged to engage, carry and to disengage the total wheel of higher order during the carrying portion of said reciprocating movement, actuating means to impart reciprocating movement to said carrying element, and means to set said set levers to normal position, said last mentioned means being arranged to be functionally effective after the carrying portion of said reciprocating movement and before the portion of such movement following the carrying portion of said reciprocating movement.

21. In a computing machine, totalizing mechanism comprising a series of total wheels arranged to be rotated in one direction for addition and in the reverse direction for subtraction, and a carrying train arranged between each two adjacent total wheels and comprising a carrying element arranged to be set in position to engage and carry the total wheel of higher order in either direction when actuated, means operatively connected to the total wheel of lower order and actuated by same during rotation in either direction to set said element in position to carry when actuated, means to actuate said carrying element, said carrying element being arranged to engage, carry and to disengage the total wheel of higher order during the carrying portion of said actuating movement.

22. In a computing machine, totalizing mechanism comprising a series of total wheels arranged to be rotated in one direction for addition and in the reverse direction for subtraction, and a carrying train arranged between each two adjacent total wheels, said carrying train comprising a carrying element arranged to be set in position to engage and carry the total wheel of higher order in either direction when actuated, means operatively connected to the total wheel of lower order and actuated by same during rotation in either direction to set said element in position to carry when actuated, and means to actuate said carrying element, said carrying element being arranged to have reciprocating movement and adjustable to carry the total wheel of higher order in either direction, and said carrying element being arranged to engage, carry and disengage the total wheel of higher order during the carrying stroke of said reciprocating movement.

23. In a computing machine, totalizing mechanism comprising a series of total wheels arranged to be rotated in one direction for addition and in the reverse direction for subtraction, and a carrying train arranged between each two adjacent total wheels, said carrying train comprising a carrying element arranged to have reciprocating movement and arranged to be set in position to engage, carry and to disengage the total wheel of higher order in either direction during the carrying stroke of said reciprocating movement, means to positively lock said carrying element in normal position and in set position, and means operatively connected to the total wheel of lower order to set said element in position to carry, said last-mentioned means being arranged to be functionally effective during rotation of said total wheel in either direction.

24. In a computing machine, totalizing mechanism comprising a series of total wheels arranged to be rotated in one direction for addition and in the reverse direction for subtraction, and a carrying train between each two adjacent total wheels and comprising a carrying element adapted to engage and carry the total wheel of higher order in either direction, means to actuate the carrying elements, said means comprising two series of actuating cams, one of said series of cams being arranged to actuate the carrying elements to carry the total wheels in the direction of addition and the other of said series of cams being arranged to actuate the carrying elements to carry the total wheels in the direction of subtraction, and means to operatively connect either of said series of cams with said carrying elements.

25. In a computing machine, totalizing mechanism comprising a series of total wheels arranged to be rotated in one direction for addition and in the reverse direction for subtraction, and a carrying train arranged between each two adjacent total wheels, said carrying train comprising a carrying element arranged to be set in position to carry the total wheel of higher order in either direction when actuated, a set lever operatively connected to the total wheel of lower order to set said carrying element in position to carry, means to positively lock said set lever in normal position and in set position, means operatively connected to the total wheel of lower order to unlock, set and relock said set lever during rotation in either direction, and means to actuate said carrying element, said carrying element being arranged to engage, carry and to disengage the total wheel of higher order during the carrying part of said actuation.

26. A computing machine comprising a series of total wheels arranged to be rotated in one direction for addition and in the reverse direction for subtraction, and a carrying train arranged between each two adjacent total wheels, said carrying train comprising a carrying element arranged to engage and carry in either direction the total wheel of higher order, a set lever operatively connected to the total wheel of lower order to be actuated by same during rotation in either direction to set the carrying element in position to carry when actuated, a lock lever operatively connected to the total wheel of lower order and to the set lever arranged to lock said set lever in normal position and in set position and arranged to be released by the total wheel of lower order during rotation in either direction, means to adjust said carrying element to carry in either direction, means to actuate said carrying element to carry the total wheel of higher order in either direction, said carrying element being non-yieldingly permanently operatively connected to said set lever.

27. In a computing machine, totalizing mechanism comprising a series of total wheels arranged to be rotated in one direction for addition and in the reverse direction for subtraction, and a carrying train arranged between each two adjacent total wheels and comprising a carrying element arranged to have reciprocating movement and arranged to be set in position to engage, carry and to disengage the total wheel of higher order in either direction during the carrying portion of said reciprocating movement, means to lock said carrying element in normal position, and means operatively connected to the total wheel of lower order to unlock, to set in position to carry, and to relock said element, said last mentioned means being arranged to be functionally effective during rotation of said total wheel in either direction.

28. In a computing machine, totalizing mechanism comprising a series of total wheels arranged to be rotated in one direction for addition and in the reverse direction for subtraction, and a carrying train arranged between each two adjacent total wheels and comprising a carrying element arranged between each two adjacent total wheels and comprising a carrying element arranged to have reciprocating movement to engage and carry the total wheel of higher order in either direction and a lock pawl for the total wheel of higher order, to lock same against rotation and arranged to be actuated to unlock and relock the total wheel during carrying movement of said carrying element, means to actuate said carrying element and said lock pawl and comprising two series of actuating cams, one of said series of cams being arranged to actuate the carrying elements to carry the total wheels in the direction of addition and to unlock and relock the total wheels during said carrying movement, and the other of said series of cams being arranged to actuate the carrying elements to carry the total wheels in the direction of subtraction, and to unlock and relock the total wheels during said carrying movement, and means to operatively connect either of said series of cams with said carrying elements and said lock pawls.

29. In a computing machine, item mechanism and totalizing mechanism comprising a series of total wheels and a lock-pawl for each total wheel to positively lock the total wheel against rotation, means operatively connected to said item mechanism to release said lock-pawls from their respective total wheels, a carrying train arranged between each two adjacent total wheels, and means operatively connected to said carrying train to release and relock the lock pawl of the total wheel of higher order.

30. In a computing machine, totalizing mechanism comprising a series of total wheels a lock lever for each of said total wheels, a carrying train arranged between each two adjacent total wheels and arranged to be set to release and carry the total wheel of higher order when actuated, a release lever permanently operatively connected to the lock lever of the total wheel of higher order and arranged to be actuated to release the lock lever of the total wheel of higher order, said release lever and said lock lever being non-yieldingly permanently operatively connected, and means operatively connected to said carrying trains to actuate the release levers of such carrying trains as have been set to release and carry.

31. In a computing machine, totalizing mechanism comprising a series of totalizing wheels, a carrying train arranged between each two adjacent total wheels and comprising a lock element to engage and positively lock the total wheel of higher order against rotation, an element arranged to have reciprocating movement to actuate the total wheel of higher order for carrying movement, and means operatively connected to said last mentioned element to release and relock the lock element of the total wheel of higher order, said two elements being non-yieldingly permanently operatively connected.

32. In a computing machine, totalizing mechanism comprising a series of total wheels, a carrying train arranged between each two adjacent total wheels and comprising a lock element to engage and lock the total wheel of higher order against rotation, an actuating element arranged to have reciprocating movement to actuate the total wheel of higher order for carrying movement, a carrying element arranged to engage and carry the total wheel of higher order and being non-yieldingly permanently operatively connected to said actuating element, and means operatively connected to said actuating element to release and relock the lock element of the total wheel of higher order, said means being arranged to release said total wheel after said carrying element is in engagement with said total wheel and to relock said total wheel before said carrying element is out of engagement with said total wheel.

33. In a computing machine, totalizing mechanism comprising a series of total wheels, devices for positively locking said total wheels, a carrying train arranged between each two adjacent total wheels and arranged to be set in position to release and carry the total wheel of higher order and comprising a carrying element arranged to have reciprocating movement and arranged to be set in position to engage, carry and to disengage the total wheel of higher order during the carrying portion of said reciprocating movement, a release lever permanently operatively connected to the locking device of the total wheel of higher order, means to positively lock said carrying element in normal position, means operatively connected to the total wheel of lower order to unlock said carrying element, to set same in position to carry, and to lock same in set position, means to actuate said carrying trains and to thereby release, carry and relock the total wheel of higher order of such carrying trains as have been set in position to carry, and means to restore said carrying trains to normal position.

34. In a computing machine, totalizing mechanism comprising a series of total wheels arranged to be rotated in one direction for addition and in the reverse direction for subtraction, a lock pawl for each total wheel, and a carrying train arranged between each two adjacent total wheels and comprising a carrying member arranged to be set to engage and carry the total wheel of higher order in either direction when actuated, said lock pawl being non-yieldingly permanently operatively connected to said carrying train, and means operatively connected to said carrying train to release said lock pawl from its total wheel during the carrying movement of the total wheel in either direction.

35. In a computing machine, totalizing mechanism comprising a series of total wheels arranged to be rotated in one direction for addition and in the reverse direction for subtraction, a lock pawl for each total wheel, and a carrying train arranged between each two adjacent total wheels and comprising a carrying member and a set mechanism, said carrying member being arranged to be set to engage and carry the total wheel of higher order in either direction when actuated, said lock-pawl being non-yieldingly permanently operatively connected to said carrying train, and said set mechanism consisting of a set lever operatively connected to the total wheel of lower order to set the carrying train in position to carry when actuated, a lock lever operatively connected to said set lever and the total wheel of lower order to positively lock said set lever in normal position and in set position, means on the total wheel of lower order to unlock, to set and to relock said set lever during rotation in either direction, and means arranged to be set by said set lever in position to release the lock pawl of the total wheel of higher order, said carrying being non-yieldingly permanently operatively connected to said set lever.

36. In a computing machine, totalizing mechanism comprising a series of total wheels, a carrying train arranged between each two adjacent total wheels and comprising an actuating member having means operatively connected thereto, to engage and carry the total wheel of higher order, a lock pawl operatively connected to the total wheel of higher order and to said actuating member, and arranged to lock the total wheel of higher order against rotation, means on said actuating member to lock the lock-pawl in normal position, and to release and relock the lock-pawl, and arranged to be functionally effective to release and relock during carrying actuation of the carrying train.

37. In a computing machine, totalizing mechanism comprising a series of total wheels, a carrying train arranged between each two adjacent total wheels and comprising a set element arranged to be positively locked in normal and in set position, and means operatively connected to the total wheel of lower order to unlock, set and relock said set lever, a lock element arranged to normally lock the total wheel of higher order against rotation and being operatively connected to said set element, means operatively connected to said set element to lock said lock element in normal position, said means being arranged to be set in ineffective position to lock the lock element by the setting actuation of the set lever, and being arranged to be set in effective position to lock the lock element by the resetting actuating of the set element.

38. In a computing machine, totalizing mechanism comprising a series of total wheels arranged to be rotated in one direction for addition and in the reverse direction for subtraction, a carrying train arranged between each two adjacent total wheels and comprising a set element arranged to be positively locked in normal and in set position, means operatively connected to the total wheel of lower order and arranged to be functionally effective during rotation of said total wheel in either direction, to unlock, to set and to relock said set lever, a lock element arranged to normally lock the total wheel of higher order against rotation and being operatively connected to said set element, means on said set lever to lock said lock lever in normal position, said means being arranged to be set in ineffective position to lock, by the setting movement of the set element, and being arranged to be set in effective position to lock, by the resetting movement of the set element, an actuating element having means operatively connected thereto to engage and carry the total wheel of higher order in either direction, means on said actuating element to lock the lock-pawl in normal position and to release and relock said lock-pawl, said last mentioned means being arranged to be functionally effective to release and to relock the lock-pawl during the carrying actuation of said carrying trains.

39. In a computing machine, a totalizing mechanism comprising total wheels and a carrying mechanism, said carrying mechanism comprising carrying members adapted to actuate the total wheels, said total wheels having concentric surfaces thereon adapted to lock the carrying members in normal and in set position, and said total wheels having recesses in their concentric surfaces adapted to release the carrying members, and means on the total wheels to set the carrying members, said total wheels being arranged to release, set and relock said carrying members during rotation in either direction.

40. In a computing machine, a totalizing mechanism comprising total wheels and a carrying mechanism, said carrying mechanism comprising carrying members adapted to actuate the total wheels, locking means connected to the carrying members to lock the same in normal and in set position, and means on the total wheels to release the locking means and to set the carrying members, said means on the total wheels being functionally effective during rotation of the total wheels in either direction.

41. In a computing machine, a totalizing mechanism comprising total wheels and a carrying mechanism, said carrying mechanism comprising total wheels adapted to rotate in one direction for addition and in the reverse direction for subtraction, carrying members adapted to actuate the total wheels, means connected to the total wheels and functionally effective during rotation of same in either direction to lock the carrying members in normal position, to set the same in effective position and to relock the same in effective position, and actuating means to actuate the carrying members and to restore the same to normal position.

42. In a computing machine, a totalizing mechanism comprising total wheels and a carrying mechanism, said carrying mechanism comprising total wheels arranged to be rotated in one direction for addition and in the reverse direction for subtraction, carrying members adapted to actuate the total wheels, means on the total wheels to set the carrying members in effective position to carry when actuated, actuating means to actuate the carrying members and to restore same to normal position, and means operatively connected to said carrying members, to said total wheels and to said actuating means to lock said carrying members in normal and in set positions.

43. In a computing machine, a totalizing mechanism comprising total wheels and a carrying mechanism, said carrying mechanism comprising total wheels arranged to be rotated in one direction for addition and in the reverse direction for subtraction, disks connected to the total wheels and having concentric surfaces and recessed portions in said surfaces, carrying members adapted to actuate the total wheels, projecting parts on the total wheels to set the carrying members in position to carry when actuated, and means connected to said carrying members to lock said members in normal and in set positions, said means being held in effective or locking position by the concentric surfaces of the aforesaid disks and being released and relocked by the recessed portions thereof.

44. In a computing machine, a totalizing mechanism comprising total wheels and a carrying mechanism, said carrying mechanism comprising total wheels arranged to be rotated in one direction for addition and in the reverse direction for subtraction, carrying members adapted to actuate the total wheels, said total wheels having concentric surfaces with recessed portions therein, projecting parts on said total wheels to set the carrying members in position to carry when actuated, locking means to lock the carrying members in normal and in set positions, said locking means being held in effective or locking position by the concentric surfaces on the total wheels and being released and relocked by the recessed portions thereof, said projecting parts being functionally effective during the intervals between the release and relocking of the carrying members, and a plurality of disks arranged to be rotatable in unison and having means to actuate said carrying members and to restore the same to normal position and having means to release the carrying members for said restoring movement and to relock the same in normal position.

45. In a computing machine, item mechanism comprising item wheels arranged to be rotated individually and moved laterally in unison to represent an item, keys representing the digits adapted to set the item members, means to restore the item wheels to their normal rotary position, means to hold the item wheels in their normal rotary position, means to restore the item wheels to their normal lateral position, and means to set the last-mentioned means and said holding means in ineffective position.

46. In a computing machine, item mechanism comprising item members mounted in a laterally movable carriage, and arranged to have individual movement in proportion to the respective digits of an item, keys representing the digits, means operatively connected to said keys to cause said individual movement and said lateral movement, an item lever, means operatively connected to said item lever to restore said item members to their normal lateral position, and means to set said last mentioned means in ineffective position.

47. In a computing machine, a movable carriage, a series of item members in said carriage and arranged to be set to represent an item, a series of item retaining members in said carriage and arranged to be operatively connected to said item members and to be actuated through same to be set to represent an item, and ten keys representing the digits operatively connected to said item members to set same to represent an item.

48. In a computing machine, ten keys representing the digits "0" to "9" inclusive, a series of item members operatively connected to said keys and arranged to be set thereby to represent an item, a series of item retaining members arranged to be set to represent an item, said item members and said item retaining members being normally out of operative connection, means to bring said members and said item retaining members into operative connection, and means to transmit movement from said item members to said item retaining members.

49. In a computing machine ten keys representing the digits "0" to "9" inclusive, a series of item members operatively connected to said keys and arranged to be set thereby to represent an item, a series of item retaining members arranged to be set to represent an item, said item members and said item retaining members being normally out of operative connection, means to bring said item members and said item retaining members into operative connection, means to transmit movement from said item members to said item retaining members, and means to transmit movement from said item retaining members to said item members.

50. In a computing machine, totalizing mechanism, item mechanism and item retaining mechanism, said totalizing mechanism and said item mechanism being relatively laterally movable, said item mechanism comprising a series of item members arranged to be set to represent an item, said item retaining mechanism comprising a series of item retaining members arranged to be set to represent an item, said item members and said item retaining members being normally out of operative connection, means to bring said item members and said item retaining members into operative connection, means to transmit movement from said item members to said item retaining members, and means to operatively connect said item mechanism and said totalizing mechanism and transmit movement from said item mechanism to said totalizing mechanism.

51. In a computing machine, totalizing mechanism, item mechanism and item retaining mechanism, said totalizing mechanism and said item mechanism being relatively laterally movable, said item mechanism comprising a series of item members arranged to be set to represent an item, said item retaining mechanism comprising a series of item retaining members arranged to be set to represent an item, said item members and said item retaining members being normally out of operative connection, means to bring said item members and said item retaining members into operative connection, means to transmit movement from said item members to said item retaining members, means to operatively connect said item mechanism with said totalizing mechanism and to transfer the item from said item mechanism to said totalizing mechanism and to said item retaining mechanism, and means to transfer the item from said item retaining mechanism to said item mechanism.

52. In a computing machine, a laterally movable carriage, a series of item members in said carriage and arranged to be individually moved to be set to represent an item, a series of item retaining members mounted in said laterally movable carriage and arranged to be set to represent an item, keys representing the digits operatively connected to said item members to set same to represent an item, means to operatively connect said item members and said item retaining members, and means to transmit movement from said item members to said item retaining members.

53. In a computing machine, a laterally movable carriage, a series of item members in said carriage and arranged to be individually moved to be set to represent an item, a series of item retaining members mounted in said laterally movable carriage and arranged to be set to represent an item, keys representing the digits operatively connected to said item members to set same to represent an item, means to operatively connect said item members and said item retaining members, means to transmit movement from said item members to said item retaining members, and means to transmit movement from said item retaining members to said item members.

54. In a computing machine, a laterally movable carriage, a series of item wheels mounted in said carriage and arranged to have individual rotation to be set to represent an item, a spring operatively connected to each item wheel tending to rotate same from normal position, a retaining pawl operatively connected to each item wheel to hold same against rotation, keys representing the digits, means operatively connected to said keys to release said retaining pawls and to limit the rotation of said item wheel in proportion to the digit of the key operated, means to restore said item wheels to normal position, and means to reset said item wheels to the position assumed before said restoring movement to thereby retain the item.

55. In a computing machine, a laterally movable carriage, a series of item wheels mounted in said carriage and arranged to have individual rotation to be set to represent an item, a spring operatively connected to each item wheel to effect such individual rotation, keys representing the digits, means operatively connected to said keys to release said item wheels and to limit the rotation of said item wheels in proportion to the digit of the key operated, means to restore said item wheels to normal position, means to hold said item wheels in normal position, means to set said holding means in inoperative position to thereby cause said wheels to rotate from normal position, and means to limit the rotation of the item wheels from normal position to thereby cause said wheels to return to the position assumed before said restoring movement.

56. In a computing machine, item mechanism comprising item members mounted in a movable carriage, an item retaining device mounted in said carriage, means to set said retaining device through said item members, means to restore said item members to normal position, springs on the item members to move them from normal position, and means to limit the movement of said item members through said retaining device.

57. In a computing machine, item mechanism comprising a series of item wheels mounted in a movable carriage and item retaining mechanism, said item retaining mechanism comprising a series of wheels in said carriage adapted to be moved into operative connection with the respective item wheels after an item is set up, said item retaining wheels being actuated by the item wheels during the clearing movement of same and being restored by the springs of the item wheels.

58. In a computing machine, totalizing mechanism and item mechanism, said totalizing mechanism and said item mechanism being relatively laterally movable and arranged to be operatively connected to transmit movement from said item mechanism to said totalizing mechanism, said item mechanism comprising item members arranged to be moved individually to represent an item, keys representing the digits adapted to set the item members and to cause said relative lateral movement, an operating lever, means operatively connected to said lever to restore said item members to their normal individual position during the initial part of the actuation of the operating lever, and means to reset the item members to their former position during the final part of the actuation of said lever.

59. A computing machine having a movable carriage, two series of members coöperatively mounted in said carriage and each series being adapted to be set to represent an item, and means to set one of said series of members to correspond to an item represented by the other of said series of members.

60. In a computing machine, a movable carriage, two series of members coöperatively mounted in said carriage each series being adapted to be set to represent an item and one series being arranged to visually indicate the item, and means to actuate one of said series of members through the other of said series of members.

61. A computing machine having a movable carriage, item members in said carriage adapted to be set to represent an item and to visually indicate the same, means to actuate the item members, stop members in said carriage adapted to limit the movement of the item members, and means to set the stop members to represent an item.

62. A computing machine comprising a movable carriage, item members in said carriage, keys to set said item members and to move said carriage, an item retaining device, and means to induce coöperative actuation of said item members and said retaining device.

63. A computing machine comprising a movable carriage, item members in said carriage, keys to set the item members and to induce movement of said carriage, an item retaining device in said carriage, and means to induce coöperation of said item members and said retaining device.

64. A computing machine comprising a movable carriage, item members in said carriage, keys to set the item members and to move said carriage, item retaining members, means to move and set said retaining members through said item members and means to position the item members to correspond to the retaining members.

65. A computing machine comprising an item mechanism having item members and item key levers, and means for transmitting movement to the item members, said item key levers being fulcrumed on a common axis and each having a slot, said slot comprising an eccentric elongated portion and a radial portion, and a pivotally mounted lock bar extending through said slots and arranged to be pressed radially by the eccentric edge of the longitudinal portion of the slot of the actuated lever into the radial portions of the slots of the other levers to lock same.

66. In a computing machine, item mechanism and totalizing mechanism arranged to be relatively laterally movable, keys to induce said relative lateral movement in one direction, and a key to induce relative movement in the reverse direction.

67. In a computing machine, an item mechanism comprising a laterally movable carriage having a plurality of item wheels, keys for inducing rotation of said item wheels and lateral movement of said carriage in one direction, and a key for inducing a lateral movement of the carriage in a reverse direction.

68. In a computing machine, item mechanism and totalizing mechanism, said mechanisms being relatively laterally movable, and key levers adapted to induce such relative movement in either of two opposite directions as desired.

69. In a computing machine, item mechanism and totalizing mechanism, key levers adapted to induce step by step movement of one of said mechanisms in one direction, and means adapted to induce step by step movement thereof in the reverse direction.

70. In a computing machine, item mechanism comprising a movable carriage, a spring adapted to be set to move the carriage, means to set said spring, means to release said spring and to induce step by step movement of said carriage in one direction, and means to induce step by step movement of said carriage in the reverse direction.

71. In a computing machine, item mechanism and totalizing mechanism, means to induce step by step lateral movement of one of said mechanisms from normal position and toward normal position, as desired, and means to restore said mechanism to normal position by continuous movement.

72. In a computing machine, item mechanism comprising a laterally movable carriage, key levers adapted to induce step by step lateral movement of said carriage from normal position, and means to induce step by step lateral movement of said carriage toward normal position.

73. In a computing machine, item mechanism comprising keys representing the digits, a plurality of item members mounted in a laterally movable carriage and arranged to have individual movement to be set to represent an item, means operatively connected to said keys and arranged to be set thereby to limit the movement of said item members in proportion to the digit of the key operated, said last mentioned means being out of engagement with said item members during the individual movement of the same.

74. In a computing machine, item mechanism comprising keys representing the digits, a plurality of item members mounted in a laterally movable carriage and arranged to have individual movement to be set to represent an item, means operatively connected to said keys to cause said individual movement and said lateral movement of said item members, and means operatively connected to said keys and arranged to be set thereby to limit the movement of said item members during the individual movement of same and arranged to come in contact with said item members after same have moved in proportion to the key operated.

75. In a computing machine, item mechanism comprising keys representing the digits, a plurality of item members mounted in a laterally movable carriage and arranged to have individual movement to be set to represent an item, and means operatively connected to said keys and arranged to be moved and set by same to assume a position where, upon rotation of said item members, the same will engage said means and thereby limit their rotation in proportion to the key operated.

76. In a computing machine, an item mechanism having a laterally movable carriage and a spring for moving same, a manually operable item lever and means for transmitting manual power from said lever to said spring to rewind the same during the forward stroke of said lever.

77. In a computing machine, item mechanism and totalizing mechanism, said item mechanism comprising a laterally movable carriage, a spring to move said carriage, keys to release said carriage step by step and to set said item mechanism in a position to represent an item, a lever having means to operatively connect said item mechanism and said totalizing mechanism and to actuate said totalizing mechanism in proportion to the item represented, and means operatively connected to said lever to rewind the carriage spring during said actuation of the totalizing mechanism.

78. In a computing machine, item mechanism and totalizing mechanism, said mechanisms being relatively laterally movable and adapted to coöperate, a spring adapted to induce such lateral movement, and means to rewind the spring during the period of coöperation of said mechanisms.

79. In a computing machine, item mechanism comprising a movable carriage, a spring operatively connected to said carriage to move the same from normal position, means to disconnect said spring from said carriage and to rewind the spring while the carriage is retained in the lateral position away from normal, and means to restore the carriage to normal position.

80. In a computing machine, totalizing mechanism and item mechanism comprising a laterally movable carriage, register mechanism comprising a series of register disks, a spring for each register disk tending to rotate same in one direction, means operatively connected to said carriage to rotate said register disks in the opposite direction, said means being arranged to be functionally effective when ever said item mechanism and said totalizing mechanism are operatively connected.

81. In a computing machine, totalizing mechanism and item mechanism adapted to be operatively connected, said item mechanism having a laterally movable carriage and keys arranged to move said carriage laterally step by step, a register adapted to register the number of times an item is entered, and means on said carriage to actuate said register.

82. In a computing machine, item mechanism and totalizing mechanism, said mechanisms being relatively laterally movable and adapted to be coöperatively actuated, key levers adapted to induce such relative movement, means to actuate said mechanism in any lateral position thereof, a register adapted to indicate the number of actuations of said mechanisms, and means operatively connected to the actuating means to actuate the register.

83. In a computing machine, item mechanism and totalizing mechanism, said mechanisms being relatively laterally movable and adapted to be coöperatively actuated in their various lateral positions, means to induce such relative lateral movement, an operating lever oscillatably mounted to actuate said mechanisms, a register adapted to indicate the number of actuations of said mechanisms, and means operatively connected to said lever to actuate the register.

84. In a computing machine, item mechanism and totalizing mechanism, said mechanisms being relatively laterally movable and adapted to be coöperatively actuated in their various lateral positions, means to induce said relative movement, an operating lever oscillatably mounted to actuate said mechanisms, register members corresponding respectively to the various lateral positions assumed by said mechanisms and adapted to be actuated to indicate the number of actuations of said mechanisms in each of the various lateral positions thereof, and means operatively connected to said operating lever to actuate the respective register members.

85. In a computing machine, item wheels mounted in a laterally movable carriage, means to rotate said item wheels in one direction to thereby set them to represent an item, means to impart clearing movement to said item wheels in the reverse direction and in proportion to said setting movement, totalizing wheels, and means to transmit the clearing movement of the item wheels to the totalizing wheels to thereby rotate same in one direction for addition or in the reverse direction for subtraction.

86. In a computing machine, item wheels mounted in a laterally movable carriage, means to rotate said item wheels in one direction to thereby set them to represent an item, means to impart clearing movement to said item wheels in the reverse direction and in proportion to said setting movement, totalizing wheels, and means to transmit the clearing movement of the item wheels to the totalizing wheels, said means being adapted to be adjusted to either cause the total wheels to be rotated in one direction for addition or in the reverse direction for subtraction.

87. In a computing machine, item mechanism and totalizing mechanisms, each totalizing mechanism comprising a series of total wheels and a locking device for the total wheels, means to operatively connect said totalizing mechanisms with said item mechanism separately or collectively at will, and means to release the locking device of either or both of said series of total wheels.

88. In a computing machine, item mechanism and totalizing mechanisms, each totalizing mechanism comprising a series of total wheels and a lock element for each total wheel, means to operatively connect said totalizing mechanism with said item mechanism separately or collectively at will, and means to release the lock element of such total wheels as are in operative connection with said item mechanism.

89. In a computing machine, item mechanisms comprising a laterally movable carriage, totalizing mechanism each comprising a series of total wheels and a lock element for each total wheel, means to operatively connect said totalizing mechanisms individually or collectively with said item mechanism, and means operatively connected to said carriage to release the lock element of such total wheels as are brought into operative connection with the item mechanism.

90. In a computing machine, item mechanism, two totalizing mechanisms normally out of operative connection with said item mechanism, each totalizing mechanism comprising a series of total wheels arranged to be rotated in one direction for addition and in the reverse direction for subtraction, means for operatively connecting either or both of said totalizing mechanisms to said item mechanism, means to set the item mechanism to correspond with an item, and means to actuate said totalizing mechanisms in proportion to the item mechanism to add the item into both totalizing mechanisms or to subtract it from both or to add it to one and subtract it from the other of said totalizing mechanisms.

91. In a computing machine, item mechanism and two series of total wheels, means to operatively connect said item mechanism with both of said series of total wheels, means to simultaneously enter items into both series of total wheels and to rotate one series of total wheels in one direction and the other series of total wheels in the other direction, and visual means to determine the position of the total wheels.

92. In a computing machine, item wheels mounted in a laterally movable carriage, means to rotate said item wheels in one direction to represent an item, means to impart clearing movement to said item wheels in the reverse direction and in proportion to said setting movement, two series of totalizing wheels, and means to transmit the clearing movement of the item wheels to either or both of said series of total wheels to thereby rotate same in one direction for addition and in the reverse direction for subtraction.

93. In a computing machine, item wheels mounted in a laterally movable carriage, means to rotate said item wheels in one direction to represent an item, means to impart clearing movement to said item wheels in the reverse direction and in proportion to said setting movement, two series of totalizing wheels, and means to transmit the clearing movement of the item wheels to either or both of said series of total wheels, said last mentioned means being adapted to be adjusted to cause both series of total wheels to be rotated in one direction for addition and in the reverse direction for substraction or to cause one series to rotate for addition and one for subtraction.

94. A computing machine comprising item mechanism and two totalizing mechanisms, each totalizing mechanism having a series of total wheels, a second series of wheels arranged in sets of two loosely on a common shaft, one wheel of a set being in mesh with a total wheel of one totalizing mechanism and the other wheel of the set being in mesh with a total wheel of the other totalizing mechanism, a third series of wheels, and means to operatively connect either one or both series of total wheels with said last-mentioned series of wheels, each item wheel being arranged to engage two wheels of said third series simultaneously.

95. A computing machine comprising totalizing mechanisms, a clearing device for each totalizing mechanism, and means for actuating said clearing devices individually or jointly as desired.

96. A computing machine comprising totalizing mechanisms, a clearing device for each totalizing mechanism, means for actuating said clearing devices individually or jointly, a printing device, and means for transmitting the clearing movement of either of said totalizing mechanisms to said printing device.

97. A computing machine comprising totalizing mechanisms, a clearing device for each totalizing mechanism, means for actuating said clearing devices individually or collectively, a locking device for the total wheels of each totalizing mechanism, and means to release the locking devices of said total wheels individually or collectively.

98. A computing machine comprising an item mechanism, a totalizing mechanism comprising a plurality of total wheels rotatable in opposite directions, a printing mechanism operatively connected to said totalizing mechanism to be actuated thereby to position the printing member of said printing mechanism, and means for actuating the printing member.

99. In a computing machine, a set of ten printing type representing the digits for each decimal order and arranged to be moved in proportion to an item, a series of total wheels arranged to be rotated in one direction for addition and in the reverse direction for substraction, and means for transmitting adding or subtracting movement from said total wheels to said printing type.

100. In a computing machine, a set of ten printing type representing the digits for each decimal order, each set of type being arranged in longitudinal series on a slidingly mounted bar, two series of total wheels arranged to be rotated in one direction for addition and in the reverse direction for subtraction, and means to transmit adding or subtracting movement from either of said series of total wheels to said printing type.

101. In a computing machine, item mechanism, totalizing mechanism and printing mechanism, said printing mechanism being normally out of operative connection with said item mechanism and comprising type arranged to be moved to the printing point, means to operatively connect said printing mechanism with said item mechanism and totalizing mechanism, and means to set said last-mentioned means in inoperative position.

102. In a computing machine, a set of ten printing type representing the digits for each decimal order and arranged to be moved in proportion to an item, two series of total wheels arranged to be rotated in one direction for addition and in the reverse direction for subtraction, and means to transmit adding or subtracting movement from either of said series of total wheels to said printing type.

103. In a computing machine, a set of ten printing type representing the digits for each decimal order, each set of type being arranged in longitudinal series on a slidingly mounted bar, two series of total wheels arranged to be rotated in one direction for addition and in the reverse direction for subtraction, and means to transmit adding or subtracting movement from either of said series of total wheels to said printing type.

104. In a computing machine, totalizing mechanism and printing mechanism, said printing mechanism being arranged to be operatively connected to said totalizing mechanism and arranged to be actuated through same, said totalizing mechanism comprising a series of total wheels arranged to be rotated in one direction for addition and in the reverse direction for subtraction, said printing mechanism comprising a set of ten type representing the digits for each decimal order of the capacity of the machine, and means to transmit adding or subtracting movement from said total wheels to said printing type.

105. A computing machine comprising totalizing mechanism, and printing mechanism arranged to be operatively connected to said totalizing mechanism, means for clearing the totalizing mechanism and actuating said printing mechanism in proportion, means to operatively connect said printing mechanism with said totalizing mechanism, and means to set said last-mentioned means in inoperative position.

106. In a computing machine, an impact printing mechanism comprising an elongated resilient plate having characters thereon, said plate being flexibly and movably mounted, and a hammer adapted to strike against the back of said plate and thereby deflect the same to print the character back of which the hammer strikes.

107. In a computing machine, an impact printing device comprising an elongated thin strip of resilient material having a longitudinally arranged series of characters thereon, said strip being flexibly mounted and being movable lengthwise, and a hammer arranged to strike the back of said strip and thereby deflect the same to print the character back of which the hammer strikes.

108. In a computing machine, an impact printing device comprising a thin strip of flexible material having embossed type arranged in a longitudinal series thereon, said strip being flexibly and longitudinally movably mounted, and a hammer adapted to strike against the back of said strip and thereby print the character back of which it strikes.

109. A flexible strip having printing characters thereon and a bar mounted to move longitudinally, said strip having a flexible connection with said bar.

110. A type-bar mounted to move longitudinally, and a flexible strip flexibly mounted on said bar and having printing characters embossed thereon.

111. A type-bar mounted to move longitudinally, a flexible member fastened to said bar, a flexible strip having printing characters thereon and fastened at one end to said type-bar and at its other end to said flexible member.

112. A printing mechanism comprising a type-bar, a spring fastened at one end to said type-bar, a flexible strip having printing type thereon and fastened at one end to said bar and at its other end to said spring, said spring being arranged to hold said flexible strip taut on said bar to deflect during printing operation and to compensate for any stretch of said strip.

113. In a computing machine, a flexible strip having embossed type, means to print from said type, and a spring operatively connected to said strip to hold the same taut and arranged to deflect during printing from said type.

114. In a computing machine, printing mechanism comprising a series of flexible strips having embossed type thereon representing the digits, said strips being flexibly mounted and individually movable to be set to represent an item, and means to print items from said type.

115. In a computing machine, printing mechanism comprising a series of flexible strips having embossed type thereon representing the digits and arranged in longitudinal series, said strips being flexibly mounted and individually longitudinally movable to be set to represent an item, means to print items from said type, and a spring operatively connected to each of said strips to normally hold the same taut and arranged to deflect during printing from said type.

116. A computing machine comprising an item mechanism, a totalizing mechanism, means for transferring the item into the totalizing mechanism, a secondary item indicator, means for restoring said item indicator to normal position, and means whereby the clearing of the item mechanism sets said indicator.

117. A computing machine comprising an item mechanism, an item indicator, means whereby the clearing of the item mechanism sets said indicator, and means whereby said indicator is restored to normal position before the clearing of the item mechanism.

118. In a computing machine, item mechanism and totalizing mechanism, a secondary item indicator, keys to set the item mechanism to correspond to an item, an operating lever, means to connect said item mechanism with said totalizing mechanism and to connect said secondary item indicator with said totalizing mechanism simultaneously and to operatively maintain such connections during the entering of an item and to disconnect them after having entered an item, and means operatively connected to said keys to clear said secondary item indicator.

119. In a computing machine, item mechanism having item members and keys to set the item members, a totalizing mechanism, a secondary item indicator adapted to indicate the last item entered, means to induce coöperation of said item mechanism and said totalizing mechanism and coöperation of said item indicator and said totalizing mechanism, and means operatively connected to the keys to restore said item indicator.

120. In a computing machine, totalizing mechanism comprising a series of total wheels having ten teeth or a multiple of ten, and a clearing mechanism comprising a series of ten tooth pinions each having the tenth tooth removed, said pinions being arranged to mesh with said total wheels and said total wheels having every tenth tooth modified to clear the pinion, said two series of gears being so arranged that, with the total wheels in normal position, the rotation of said pinions will not actuate the total wheels and, with the total wheels out of normal position, the pinions upon rotation will engage and rotate to normal position such total wheels as are out of normal position, said total wheels being free to rotate during normal position of the pinions.

In testimony whereof I have signed my name in the presence of two subscribing witnesses this 29th day of June, 1907.

RICHARD VON REPPERT.

Witnesses:
J. B. MEGOWN,
G. A. PENNINGTON.